US010149176B2

(12) United States Patent
Miyakawa et al.

(10) Patent No.: US 10,149,176 B2
(45) Date of Patent: Dec. 4, 2018

(54) MOBILE COMMUNICATION SYSTEM AND BASE STATION CONTROL APPARATUS

(71) Applicant: SoftBank Corp., Minato-ku, Tokyo (JP)

(72) Inventors: Junichi Miyakawa, Tokyo (JP); Teruya Fujii, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 148 days.

(21) Appl. No.: 15/114,470

(22) PCT Filed: Jan. 18, 2014

(86) PCT No.: PCT/JP2014/051746
§ 371 (c)(1),
(2) Date: Jul. 27, 2016

(87) PCT Pub. No.: WO2015/114729
PCT Pub. Date: Aug. 6, 2015

(65) Prior Publication Data
US 2016/0345189 A1    Nov. 24, 2016

(51) Int. Cl.
*H04W 24/02* (2009.01)
*H04B 7/185* (2006.01)
(Continued)

(52) U.S. Cl.
CPC ........ *H04W 24/02* (2013.01); *H04B 7/18517* (2013.01); *H04B 7/18519* (2013.01);
(Continued)

(58) Field of Classification Search
None
See application file for complete search history.

(56) References Cited

U.S. PATENT DOCUMENTS

| 5,490,284 A * | 2/1996 | Itoh ................... H04B 7/18563 455/11.1 |
| 2003/0153267 A1* | 8/2003 | Karabinis .......... H04B 7/18563 455/13.1 |

(Continued)

FOREIGN PATENT DOCUMENTS

JP    2009-504011 A    1/2009

OTHER PUBLICATIONS

Tadashi Minowa, et al., "Satellite/Terrestrial Integrated Mobile Communication System for Nation's Security and Safety", Institute of Electronics, Information and Communication Engineers, Dec. 2008, vol. J91-B, No. 12.

(Continued)

*Primary Examiner* — Saba Tsegaye
(74) *Attorney, Agent, or Firm* — Muirhead and Saturnelli, LLC

(57) ABSTRACT

Mobile communication systems and base station control apparatuses are provided, by which a spectral efficiency can be improved while preventing interference between a terrestrial cellular mobile communication system and a satellite mobile communication system, and mobile communication services using mobile station apparatuses can be provided more surely in an emergent condition in which a failure occurs in a part of terrestrial cellular base stations. A same frequency band is used for radio communications between a mobile station apparatus 10 and each of terrestrial cellular base stations 20 and a communication relay apparatus 41 of artificial satellite 40. A radio resource used in the terrestrial cellular base stations 20 and a radio resource used in a satellite base station 30 in a common area where the terrestrial cellular mobile communication system and the satellite mobile communication system are available are allocated so as not to overlap with each other, and the radio resource allocated for the satellite base station is increased in the (Continued)

emergent condition in which a failure occurs in a part of the terrestrial cellular base stations so as to be more than that in a normal condition.

20 Claims, 16 Drawing Sheets

(51) Int. Cl.
    *H04W 16/28*     (2009.01)
    *H04W 16/14*     (2009.01)
    *H04W 72/04*     (2009.01)
    *H04W 24/04*     (2009.01)
    *H04W 84/04*     (2009.01)
    *H04W 84/06*     (2009.01)

(52) U.S. Cl.
    CPC ........... *H04W 16/14* (2013.01); *H04W 16/28* (2013.01); *H04W 24/04* (2013.01); *H04W 72/0446* (2013.01); *H04W 84/042* (2013.01); *H04W 84/06* (2013.01)

(56) References Cited

U.S. PATENT DOCUMENTS

| | | | |
|---|---|---|---|
| 2007/0026867 A1 | 2/2007 | Karabinis | |
| 2007/0123252 A1* | 5/2007 | Tronc | H04B 7/18563 455/427 |
| 2009/0257345 A1* | 10/2009 | King | H04L 41/22 370/216 |
| 2010/0035604 A1* | 2/2010 | Dutta | H04B 7/18513 455/427 |
| 2013/0315112 A1* | 11/2013 | Gormley | H04W 16/14 370/280 |

OTHER PUBLICATIONS

"Document of the Ministry of Internal Affairs and Communications", 2007, http://www.soumu.go.ip/s*news/2007/070319_3.html.

"Document of the Ministry of Internal Affairs and Communications".

* cited by examiner

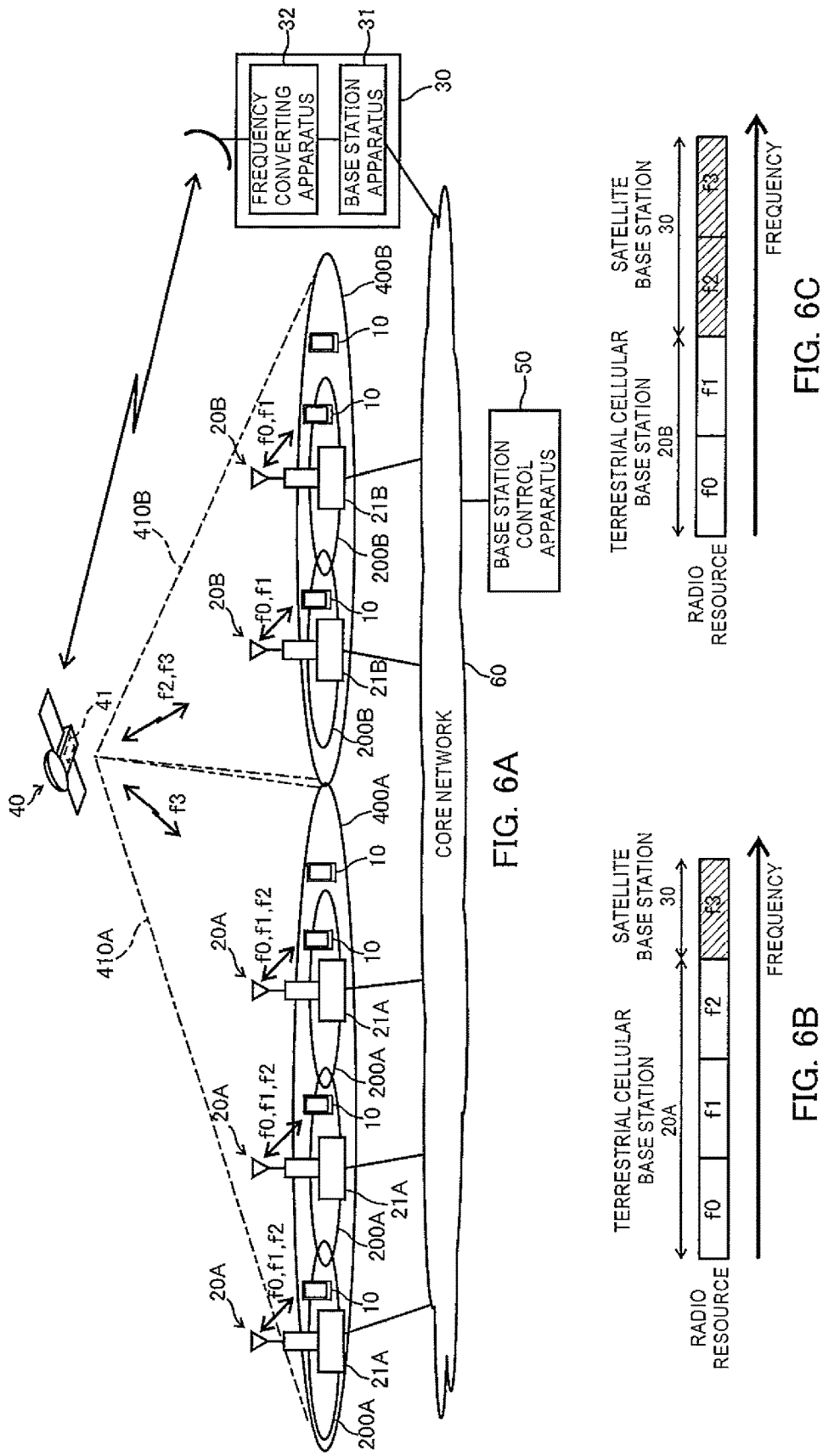

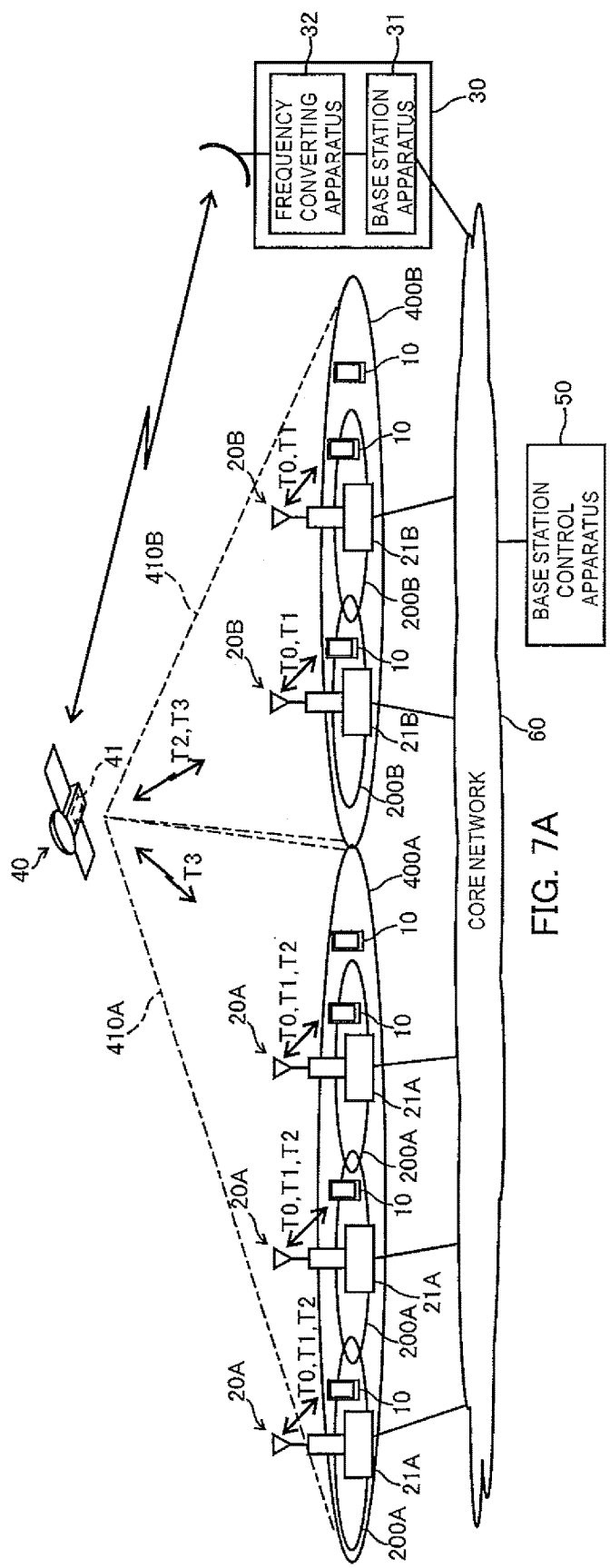
FIG. 7A
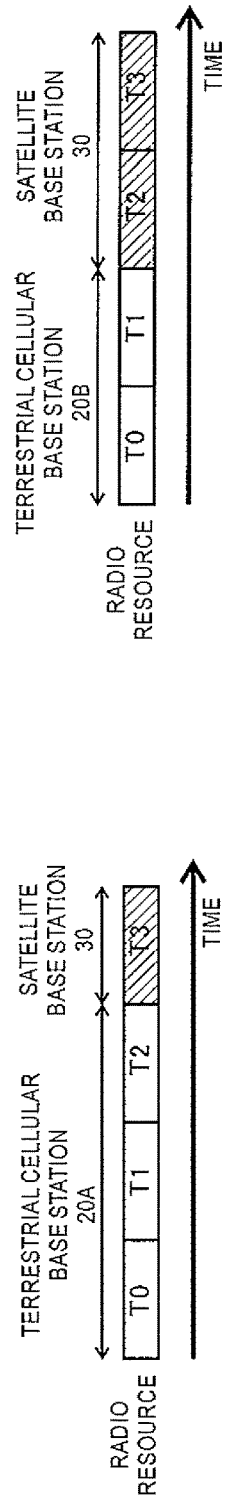
FIG. 7B
FIG. 7C

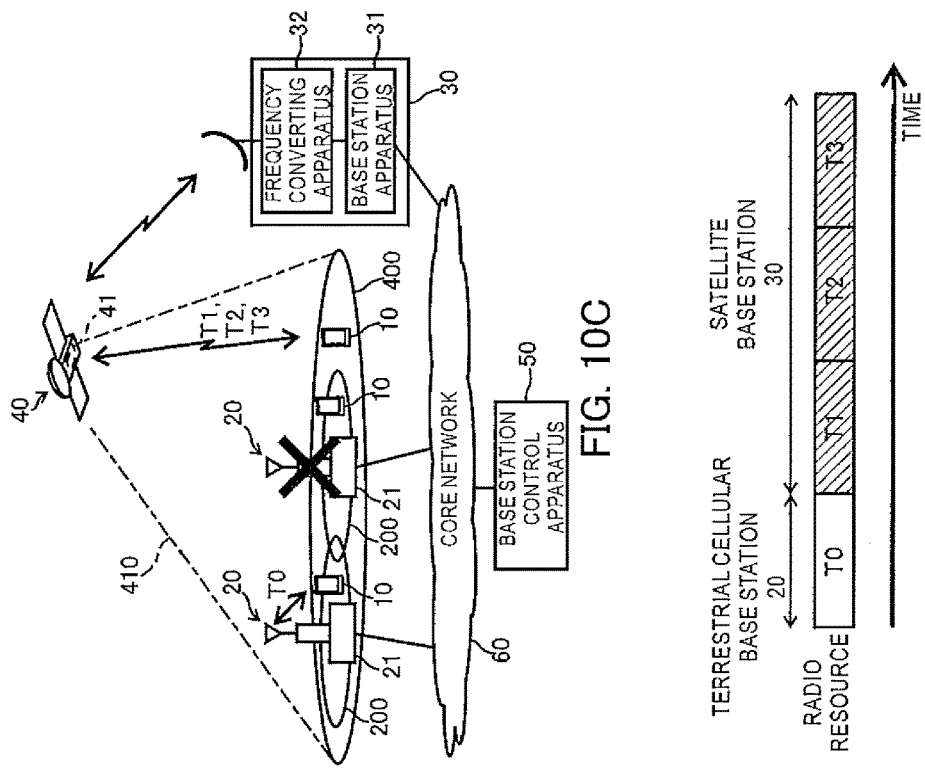
FIG. 10C
FIG. 10D
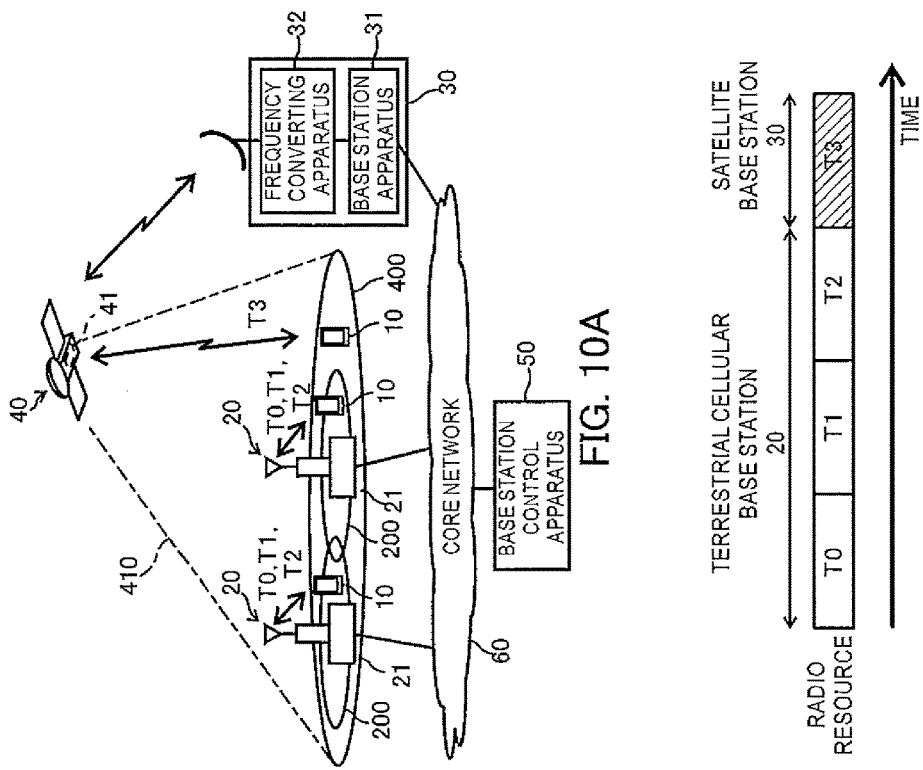
FIG. 10A
FIG. 10B

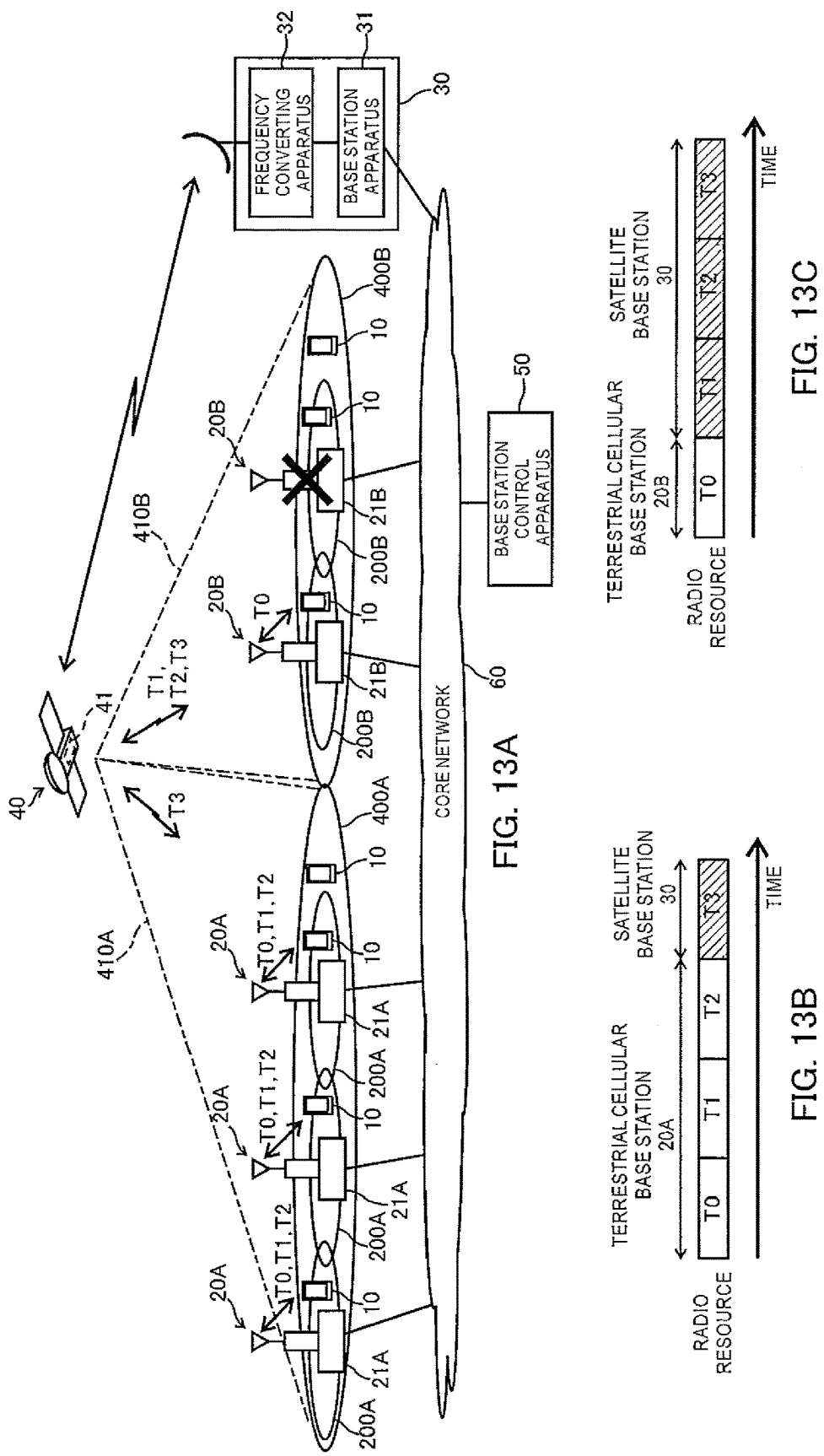

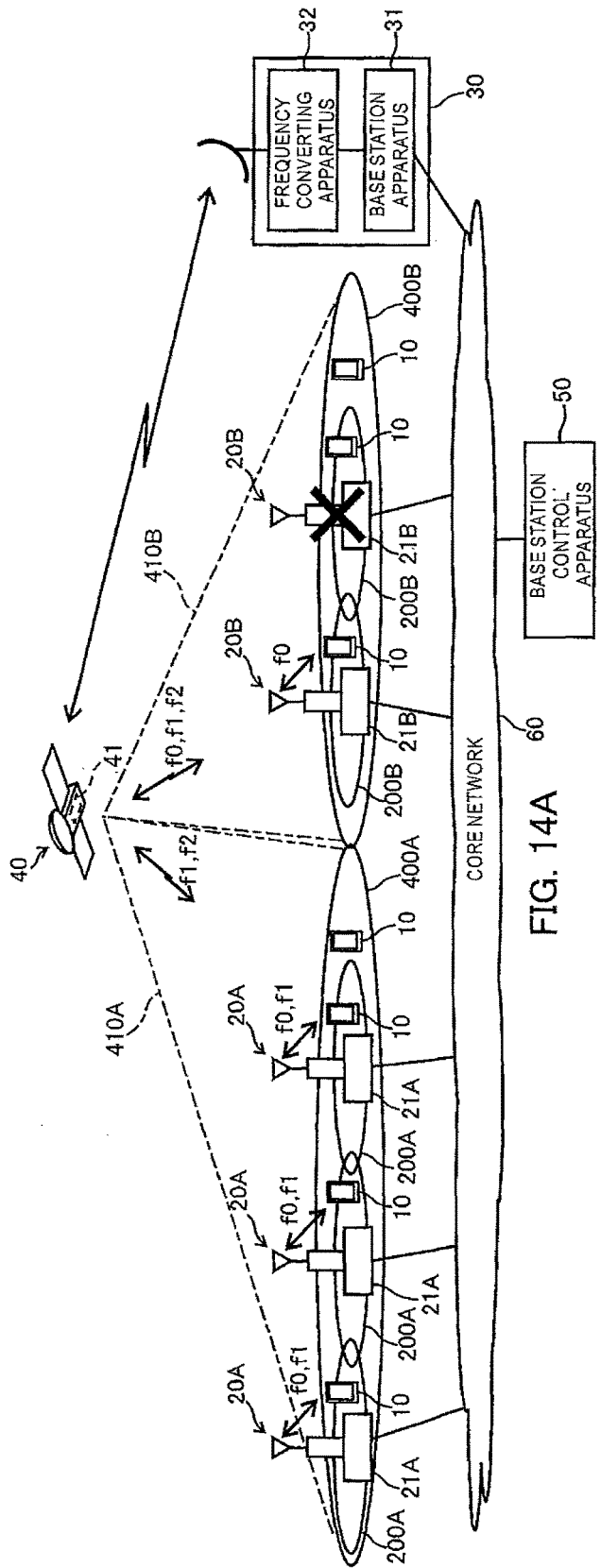
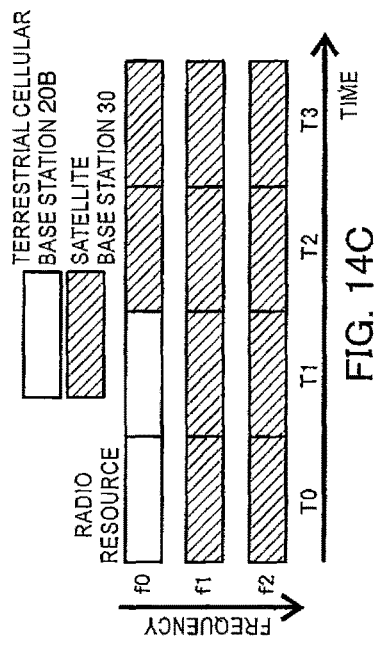
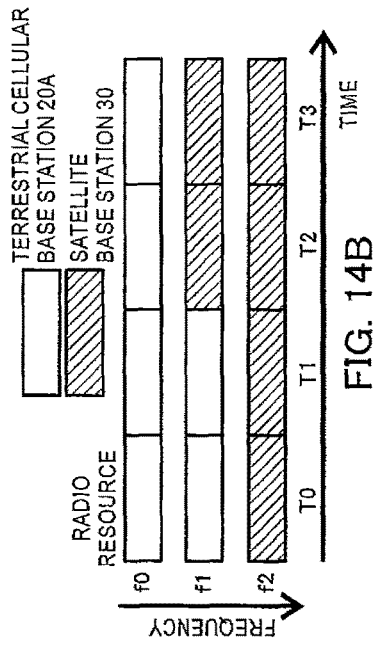
FIG. 14A
FIG. 14B
FIG. 14C

MOBILE COMMUNICATION SYSTEM AND BASE STATION CONTROL APPARATUS

TECHNICAL FIELD

The present invention relates to a mobile communication system capable of performing a communication using a mobile station apparatus and a base station control apparatus used in the mobile communication system.

BACKGROUND ART

An integrated type of mobile communication system (hereinafter referred to as "integrated mobile communication system") capable of using a terrestrial cellular mobile communication system via a cellular base station located on the ground and a satellite mobile communication system via an artificial satellite in a common area is conventionally known (Non-Patent Literature 1). The Non-Patent Literature 1 discloses a frequency-sharing type of integrated mobile communication system that uses a same frequency band between the terrestrial cellular mobile communication system and the satellite mobile communication system used in a common area, and a frequency-separating type of integrated mobile communication system that separates frequency bands used in the terrestrial cellular mobile communication system and the satellite mobile communication system.

CITATION LIST

Non-Patent Literature

Non-Patent Literature 1: Tadashi Minowa and six others, "Satellite/Terrestrial Integrated Mobile Communication System for Security and Safety", The Transactions of the Institute of Electronics, Information and Communication Engineers B, Vol. J91-B, No. 12, pp. 1629-1640, 2008/12.

SUMMARY OF INVENTION

Technical Problem

In the frequency-sharing type of integrated mobile communication system disclosed in the Non-Patent Literature 1, since a same frequency band is used between the terrestrial cellular mobile communication system and the satellite mobile communication system, spectral efficiency is high, however, it is easy to occur an interference between the terrestrial cellular mobile communication system and the satellite mobile communication system. On the other hand, in the frequency-separating type of integrated mobile communication system, the interference hardly occurs since the frequency bands used in the terrestrial cellular mobile communication system and the satellite mobile communication system are separated, however, the spectral efficiency is low.

Furtheremore, in the integrated mobile communication system disclosed in the Non-Patent Literature 1, in an emergent condition in which a failure occurs in a part of terrestrial cellular base stations, mobile communications via a satellite are intensively used and the mobile communication services by using the terrestrial cellular base stations is not probably provided.

Solution to Problem

A mobile communication system according to an aspect of the present invention, which is a mobile communication system capable of using a terrestrial cellular mobile communication system and a satellite mobile communication system, comprises terrestrial cellular base stations capable of performing a radio communication with a mobile station apparatus, a satellite base station capable of performing a radio communication with a mobile station apparatus via a communication relay apparatus of an artificial satellite, and a base station control apparatus of controlling the terrestrial cellular base stations and the satellite base station. Herein, a same frequency band is used for radio communications between the mobile station apparatus and each of the terrestrial cellular base stations and the communication relay apparatus of the artificial satellite in a common area where the terrestrial cellular mobile communication system and the satellite mobile communication system are available. Moreover, the foregoing base station control apparatus controls to allocate a radio resource used in the terrestrial cellular base stations and a radio resource used in the satellite base station in the common area so as not to overlap with each other, and to increase the radio resource allocated for the satellite base station in an emergent condition in which a failure occurs in a part of the terrestrial cellular base stations so as to be more than that in a normal condition.

Furtheremore, a base station control apparatus according to another aspect of the present invention controls terrestrial cellular base stations capable of performing a radio communication with a mobile station apparatus and a satellite base station capable of performing a radio communication with a mobile station apparatus via a communication relay apparatus of an artificial satellite in a mobile communication system capable of using a terrestrial cellular mobile communication system and a satellite mobile communication system. Herein, a same frequency band is used for radio communications between the mobile station apparatus and each of the terrestrial cellular base stations and the communication relay apparatus of the artificial satellite in a common area where the terrestrial cellular mobile communication system and the satellite mobile communication system are available. Moreover, the base station control apparatus according to the present aspect controls to allocate a radio resource used in the terrestrial cellular base stations and a radio resource used in the satellite base station in the common area so as not to overlap with each other, and to increase the radio resource allocated for the satellite base station in an emergent in which a failure occurs in a part of the terrestrial cellular base stations so as to be more than that in a normal condition.

According to the mobile communication system and the base station control apparatus, it is capable of improving a spectral efficiency by using a same frequency band for radio communications between the mobile station apparatus and each of the terrestrial cellular base stations and the communication relay apparatus of the artificial satellite.

Moreover, it is capable of preventing interference between the terrestrial cellular mobile communication system and the satellite mobile communication system by allocating the radio resource used in the terrestrial cellular base stations and the radio resource used in the satellite base station so as not to overlap with each other.

Further, the radio resource allocated for the satellite base station is increased in an emergent condition in which a failure occurs in a part of the terrestrial cellular base stations so as to be more than that in the normal condition. Accordingly, while improving a spectral efficiency of the terrestrial cellular mobile communication system in the normal condition, and the communications in the terrestrial cellular base stations in which a failure is occurred in the common area can be covered with the satellite communication system in the emergent condition. Therefore, it is capable of more surely providing the mobile communication services using mobile station apparatuses in the terrestrial cellular mobile communication system and the satellite mobile communication system.

The foregoing base station control apparatus may control to allocate a time slot used in the terrestrial cellular base stations and a time slot used in the satellite base station in the common area so as not to overlap with each other and to increase an allocation rate of the time slot allocated for the satellite base station in the emergent condition so as to be more than that in the normal condition, in state that the terrestrial cellular base stations and the satellite base station in the common area are synchronized in time with each other.

In this case, since a same frequency in the same frequency band can be used in the terrestrial cellular base stations and the satellite base station in the common area, it is capable of further enhancing the spectral efficiency. Furthermore, it is capable of preventing interference between the terrestrial cellular mobile communication system and the satellite mobile communication system by allocating the time slot used in the same frequency in each base station so as not to overlap with each other. Moreover, the allocation rate of the time slot allocated for the satellite base station in the emergent condition is increased more than that in the normal condition. Accordingly, while improving the spectral efficiency of the terrestrial cellular mobile communication system in the normal condition, and the communications in the terrestrial cellular base stations in which a failure is occurred in the common area can be covered with the satellite communication system in the emergent condition. Therefore, it is capable of surely providing the mobile communication services using mobile station apparatuses in the terrestrial cellular mobile communication system and the satellite mobile communication system.

The foregoing base station control apparatus may control to allocate a divided frequency band used in the terrestrial cellular base stations and a divided frequency band used in the satellite base station in the common area so as not to overlap with each other, among two or more divided frequency bands into which the foregoing same frequency band, and to increase an allocation rate of the divided frequency band allocated for the satellite base station in the emergent condition so as to be more than that in the normal condition, in state that the terrestrial cellular base stations and the satellite base station in the common area are synchronized in frequency with each other.

In this case, the interference between the terrestrial cellular mobile communication system and the satellite mobile communication system can be prevented more surely by allocating the divided frequency band used in the same frequency band in each base station in the common area so as not to overlap with each other. Moreover, the allocation rate of the divided frequency band allocated for the satellite base station in the emergent condition is increased more than that in the normal condition. Accordingly, while improving the spectral efficiency of the terrestrial cellular mobile communication system in the normal condition, and the communications in the terrestrial cellular base stations in which a failure is occurred in the common area can be covered with the satellite communication system in the emergent condition. Therefore, it is capable of surely providing the mobile communication services using mobile station apparatuses in the terrestrial cellular mobile communication system and the satellite mobile communication system.

The foregoing base station control apparatus may control to divide in time each of two or more divided frequency bands into which the same frequency band is divided, to allocate the time slot in the divided frequency band used in the terrestrial cellular base stations and the time slot in the divided frequency band used in the satellite base station in the common area so as not to overlap with each other, and to increase an allocation rate of the time slot in the divided frequency band allocated for the satellite base station in the emergent condition so as to be more than that in the normal condition, in state that the terrestrial cellular base stations and the satellite base station are in the common area synchronized in time and in frequency with each other.

In this case, the interference between the terrestrial cellular mobile communication system and the satellite mobile communication system can be prevented more surely by allocating the time slot in the divided frequency band used in the same frequency band in each base station in the common area so as not to overlap with each other. Moreover, the allocation rate of the time slot in the divided frequency band allocated for the satellite base station in the emergent condition is increased more than that in the normal condition. Accordingly, while improving the spectral efficiency of the terrestrial cellular mobile communication system in the normal condition, and the communications in the terrestrial cellular base stations in which a failure is occurred in the common area can be covered with the satellite communication system in the emergent condition. Therefore, it is capable of surely providing the mobile communication services using mobile station apparatuses in the terrestrial cellular mobile communication system and the satellite mobile communication system.

Furthermore, the foregoing base station control apparatus may control the allocation rate of radio resource according to a ratio between a communication traffic in the terrestrial cellular base stations and a communication traffic in the satellite base station, in the emergent condition or in the normal condition.

In this case, by controlling the allocation rate of radio resource according to the ratio between the communication traffics in the base stations, it is capable of further improving the spectral efficiency in the same frequency band while ensuring the communication between each of the base stations and the mobile station apparatus.

Moreover, the area in which the communication relay apparatus and the mobile station apparatus are capable of communicating with each other may be a single beam area corresponding to a beam directing along orientation of an antenna of the communication relay apparatus and the single beam area may include two or more areas of the terrestrial cellular base stations.

In this case, since the communications in the terrestrial cellular base stations in which a failure is occurred in the beam area can be covered with the satellite communication system in the emergent condition, while improving the spectral efficiency of each of the terrestrial cellular mobile communication systems via the two or more terrestrial cellular base stations located in the beam area in the normal condition, the communications in the beam area can be provided more surely.

Further, the area in which the communication relay apparatus and the mobile station apparatus are capable of communicating with each other may be two or more beam areas corresponding to two or more beams directing along different orientations of antennas of the communication relay apparatus, which are spatially shifted, and each of the two or more beam area may include two or more areas of the terrestrial cellular base stations. Herein, the foregoing base station control apparatus may perform the control of allocation rate of radio resource independently in each of the beam areas in the emergent condition or in the normal condition.

In this case, since the communications in the terrestrial cellular base stations in which a failure is occurred in the beam area can be covered with the satellite communication system in the emergent condition, while improving the spectral efficiency of each of the terrestrial cellular mobile communication systems via the two or more terrestrial cellular base stations located in each of the beam areas in the normal condition, the communications in each of the beam areas can be provided more surely.

Furthermore, the foregoing mobile communication system may further comprise the communication relay apparatus of artificial satellite, the foregoing satellite base station may comprise a base station apparatus connected with a core network and frequency converting means of performing a conversion between a frequency used in the base station apparatus and a frequency for satellite communications used in a communication (feeder link) with the communication relay apparatus of artificial satellite when relaying a communication between the base station apparatus and the communication relay apparatus of artificial satellite, and the foregoing communication relay apparatus of artificial satellite may comprise frequency converting means of performing a conversion between a frequency used in a communication with the mobile station apparatus and a frequency for satellite communications used in a communication with the satellite base station when relaying a communication between the mobile station apparatus and the satellite base station.

In this case, by using the frequency for satellite communications in a radio communication between the communication relay apparatus and the satellite base station, which is suitable for a path of the radio communication, communication quality of the radio communication is improved. Therefore, it is capable of improving overall communication quality of the satellite mobile communication system via the artificial satellite.

Moreover, radio transmission systems of the terrestrial cellular mobile communication system and the satellite mobile communication system may be same as each other.

In this case, since it is enough to implement a single radio transmission system as a radio transmission system used for the mobile station apparatus capable of performing radio communications of the terrestrial cellular mobile communication system and the satellite mobile communication system, the mobile station apparatus can be configured easily.

Further, radio transmission systems of the terrestrial cellular mobile communication system and the satellite mobile communication system may be different from each other.

In this case, since it is capable of using a radio transmission system suitable for a communication with the communication relay apparatus of the artificial satellite, especially as a radio transmission system of the satellite mobile communication system, it is capable of improving communication quality of the satellite mobile communication system.

Advantageous Effects of Invention

According to the present invention, it is capable of improving the spectral efficiency while preventing the interference between the between the terrestrial cellular mobile communication system and the satellite mobile communication system, and the mobile communication service using the mobile station apparatus of the terrestrial cellular mobile communication system and the satellite mobile communication system can be provided in the emergent condition in which a failure occurs in a part of the terrestrial cellular base stations in the common area.

BRIEF DESCRIPTION OF DRAWINGS

FIG. 6A is a schematic diagram of the overall configuration showing yet another example of an allocation control of radio resources in a normal condition of the mobile communication system according to the present embodiment, and FIG. 6B and FIG. 6C are respectively explanatory illustrations of the allocation of radio resources in the present example.

FIG. 7A is a schematic diagram of the overall configuration showing yet another example of an allocation control of radio resources in a normal condition of the mobile communication system according to the present embodiment, and FIG. 7B and FIG. 7C are respectively explanatory illustrations of the allocation of radio resources in the present example.

FIG. 10A to FIG. 10D are illustrations showing another example of an allocation control of radio resources (time slots) in a normal condition and in an emergent condition in a common area in case that a satellite used for satellite mobile communications has a single-beam antenna configuration in the mobile communication system according to the present embodiment.

FIG. 13A to FIG. 13C are illustrations showing another example of an allocation control of radio resources (time slots) in a normal condition and in an emergent condition in a common area in case that a satellite used for satellite mobile communications has a multi-beam antenna configuration in the mobile communication system according to the present embodiment.

FIG. 14A to FIG. 14C are illustrations showing yet another example of an allocation control of radio resources (frequencies and time slots) in a normal condition and in an emergent condition in a common area in case that a satellite used for satellite mobile communications has a multi-beam antenna configuration in the mobile communication system according to the present embodiment.

DESCRIPTION OF EMBODIMENTS

Hereinafter, embodiments of the present invention will be described with reference to the drawings. It is noted that respective figures will only show schematically shape, dimension and positional relationship in a degree such that the present invention can be understood, and therefore, the present invention is not limited only to shape, dimension and positional relationship illustrated in respective figures. Furtheremore, numerical values exemplified in the description hereinafter are only preferred examples in the present invention, and therefore, the present invention is not limited to the numerical values exemplified.

Figure 1:
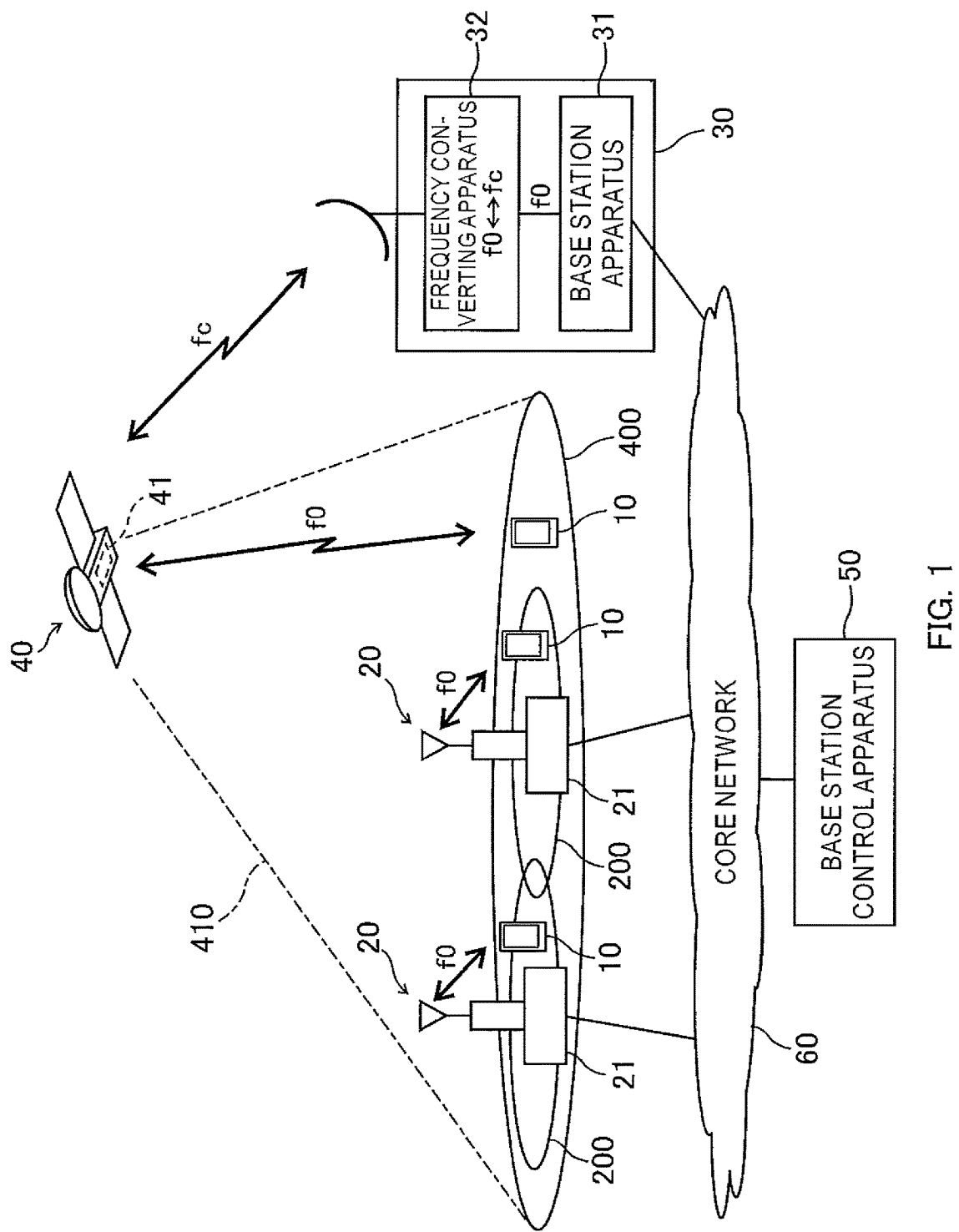
FIG. 1 is an explanatory illustration showing one example of an overall configuration of a mobile communication system according to an embodiment of the present invention.

FIG. 1 is an explanatory illustration showing one example of an overall configuration of a mobile communication system (portable telephone system) according to an embodiment of the present invention. The mobile communication system of this embodiment is a mobile communication system in which a terrestrial cellular mobile communication system via a cellular base station located on the ground and a satellite mobile communication system via an artificial satellite.

In FIG. 1, the mobile communication system of this embodiment has a base stations (hereinafter referred to "terrestrial cellular base stations") 20 capable of communicating with a mobile station apparatus 10 via the terrestrial cellular mobile communication system and a satellite base station 30 capable of communicating with the mobile station apparatus 10 via a communication relay apparatus 41 of an artificial satellite 40, and each of a base station apparatus 21 of the terrestrial cellular base station 20, a base station apparatus 31 of the satellite base station 30 and a base station control apparatus 50 is connected with a core network 60 via a wired communication link such as a dedicated link, a general-purpose link or the like, which is not shown.

In the radio communications between the mobile station apparatus 10 and each of the terrestrial cellular base stations 20 and the communication relay apparatus 41 of the artificial satellite 40, a same radio transmission system and a same frequency band are used. As a radio transmission system, for example, communication systems of the third generation (3G) mobile communication system such as a WCDMA (registered trademark) (Wideband Code Division Multiple Access), CDMA-2000 or the like, the LTE (Long Term Evolution) or LTE-Advanced communication systems, communication systems of the forth generation mobile telephone, etc. can be adopted. As a frequency band of radio communications (service link) with the foregoing mobile station apparatus 10, for example, the frequency band with a predetermined frequency bandwidth (for example, 30 MHz) in MSS band (uplink of 1980-2010 MHz and downlink of 2170-2220 MHz) standardized in the IMT (International Mobile Telecommunication)-2000 can be allocated. As a frequency band of radio communications (feeder link) between the communication relay apparatus 41 of the artificial satellite 40 and the terrestrial satellite base station 30, for example the frequency band with a predetermined frequency bandwidth in Ku band (uplink of 14 GHz and downlink of 12 GHz) standardized in the IMT-2000 can be allocated.

The mobile station apparatus 10 is a mobile telephone, a smartphone, a mobile PC having a mobile communication function, or the like, which is also called as user equipment (UE), mobile apparatus, portable communication terminal apparatus. The mobile station apparatus 10 can use the terrestrial cellular mobile communication system and the satellite mobile communication system. For example, the mobile station apparatus 10 can use the terrestrial cellular mobile communication system and the satellite mobile communication system when locating in an area overlapped between a communicable area 200 (hereinafter referred to as "terrestrial station area") with the terrestrial cellular base station 20 and a communicable area 400 (hereinafter referred to as "satellite station area") with the communication relay apparatus 41 of the artificial satellite 40. Moreover, the mobile station apparatus 10 can use the satellite mobile communication system when locating in an area outside of the terrestrial station area 200 and inside of the satellite station area 400.

The terrestrial cellular base station 20 includes the base station apparatus 21, an antenna, etc., and is capable of communicating with the mobile station apparatus 10 at a frequency f0 within the foregoing predetermined frequency band by using a predetermined radio transmission system (modulation system). As the terrestrial cellular base station 20 includes, for example, a macro base station for wide area which covers a macro cell being as a normal wide area with a radius from several hundred meters to several kilometers, a small base station installed so as to cover an area (for example, pico cell or femto cell) smaller than the area covered with the macro base station for wide area. The macro base station may be referred to as "macro cell base station", "Macro e-Node B", "MeNB", or the like, and the small base station may be referred to as "pico cell base station", "femto base station", "Home e-Node B", or "Home eNB".

The satellite base station 30 includes a base station apparatus 31 that is similar to the base station apparatus 21 of the terrestrial cellular base station 20, a frequency converting apparatus 32, an antenna, etc., and is also referred to as a "feeder link station". The satellite base station 30 uses a predetermined radio transmission system (modulation system) that is similar to the radio transmission system used in the terrestrial cellular base station 20, and is capable of communicating with the communication relay apparatus 41 of the artificial satellite 40 by converting the frequency f0 to a frequency fc for satellite communications. When the frequency converting apparatus 32 relays a communication between the base station apparatus 31 and the communication relay apparatus 41 of the artificial satellite 40, the frequency converting apparatus 32 functions as frequency-converting means that performs a conversion between the frequency f0 used in the base station apparatus 31 and the frequency fc for satellite communications used for a communication with the communication relay apparatus 41 of the artificial satellite 40.

The communication relay apparatus 41 of the artificial satellite 40 includes frequency-converting means that performs a non-regenerative frequency-conversion relay. When relaying a communication between the mobile station apparatus 10 and the satellite base station 30, the frequency converting means performs a conversion between the frequency f0 used for communications with the mobile station apparatus 10 and the frequency fc for satellite communications used for communications with the satellite base station 30. For example, the communication relay apparatus 41 can convert the frequency fc of signals received from the satellite base station 30 to the frequency f0, and communicate with the mobile station apparatus 10 at the frequency f0.

The base station control apparatus 50 can control an allocation of radio resource (frequency, time slot) with respect to the terrestrial cellular base stations 20 and the satellite base station 30 corresponding to a common area where at least one part of each radio-communicable area with the mobile station apparatus 10. That is, the base station control apparatus 50 performs a control to allocate a radio resource used in the terrestrial cellular base stations 20 and a radio resource used in the satellite base station 30 so as not to overlap with each other. Furthermore, the base station control apparatus 50 controls to increase the radio resource allocated for the satellite base station 30 in an emergent condition in which a failure occurs due to a disaster or the like in some of the terrestrial cellular base stations 20 so as to be more than that in a normal condition. For example, the base station control apparatus 50 controls to increase an allocation rate of radio resource allocated for the satellite base station 30 in the emergent condition in which a failure occurs due to a disaster or the like in some of the terrestrial cellular base stations 20 so as to be more than that in the normal condition. These controls can be performed, for example, by transmitting a predetermined control data from the base station control apparatus 50 to the terrestrial cellular base stations 20 and the satellite base station 30. Herein, the "allocation rate" of radio resource allocated for the satellite base station 30 is a rate of radio resource allocated for the satellite base station 30 in the radio resources allocated for both of the terrestrial cellular base stations 20 and the satellite base station 30 in the common area.

The mobile station apparatus 10 is configured with, for example, hardware such as a computer apparatus having a CPU, a memory, etc. and radio communication section, and can perform a radio communication with the terrestrial cellular base stations 20 and the satellite base station 30 by executing a predetermined program. Furthermore, each of the terrestrial cellular base stations 20 and the satellite base station 30 is configured with, for example, hardware such as a computer apparatus having a CPU, a memory, etc., a external communication interface section for a core network and a radio communication section, and can perform a radio communication with the mobile station apparatus 10 and a communication with the core-network side by executing a predetermined program. Moreover, the base station control apparatus 50 is configured with, for example, hardware such as a computer apparatus having a CPU, a memory, etc. and a external communication interface section for a core network, and can perform a control of the terrestrial cellular base stations 20 and the satellite base station 30.

Figure 2A:
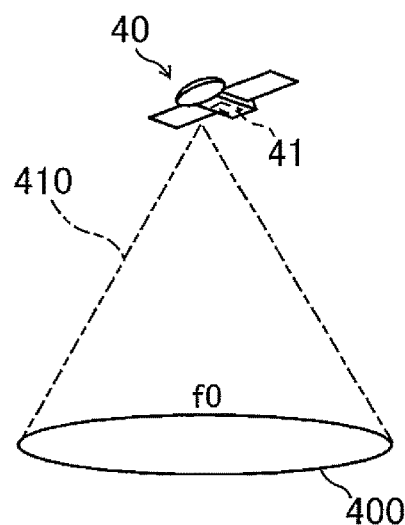
FIG. 2A to FIG. 2C are respectively explanatory illustrations showing configuration examples of satellite station areas (beam areas) in which a communication relay apparatus of artificial satellite communicates with a terrestrial mobile station apparatus
Figure 2B:
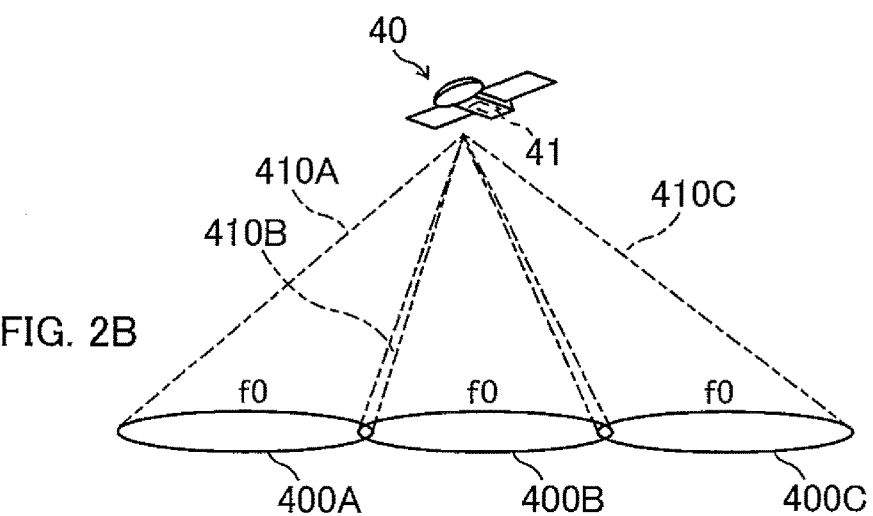
Figure 2C:
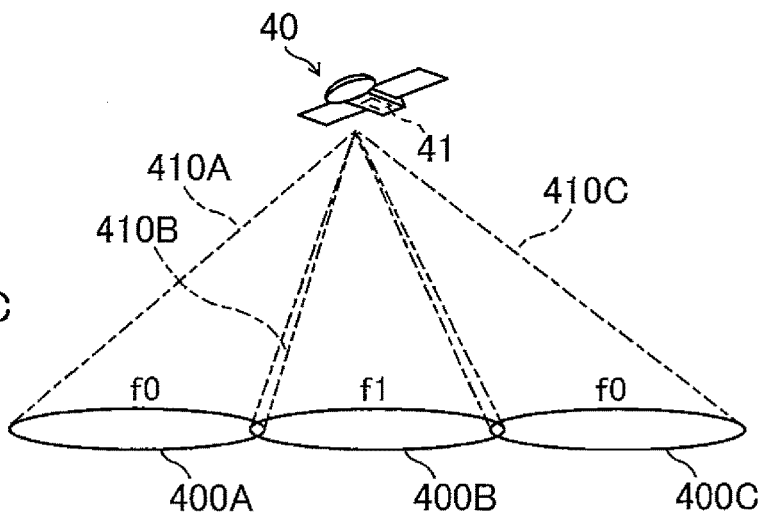

FIG. 2A to FIG. 2C are respectively explanatory illustrations showing configuration examples of satellite station areas (beam areas) in which the communication relay apparatus 41 of the artificial satellite 40 communicates with the terrestrial mobile station apparatus 10.

FIG. 2A shows an example in case that the artificial satellite 40 has a single-beam antenna configuration. The satellite station area where the communication relay apparatus 41 of the artificial satellite 40 can communicate with the terrestrial mobile station apparatus 10 is a single beam area 400 corresponding to a beam 410 directing along orientation of an antenna of the communication relay apparatus 41. The communication relay apparatus 41 can communicate with the mobile station apparatus 10 locating in the beam area 400 at the frequency f0.

Each of examples in FIG. 2B and FIG. 2C is an example in case that the artificial satellite 40 has a multi-beam antenna configuration. The satellite station areas where the communication relay apparatus 41 of the artificial satellite 40 can communicate with the terrestrial mobile station apparatus 10 are multiple beam areas 400A, 400B and 400C corresponding to multiple beams 410A, 410B and 410C directing along different orientations of an antennas of the communication relay apparatus 41. It is noted that, the examples in these figures show the case that the number of beam areas is three, however, the number of beam areas may be two, or may be equal to or more than four. Further, the multiple beam areas may be set so as to cover throughout the whole of Japan including the remote islands.

In case of the multi-beam antenna configuration shown in FIG. 2B and FIG. 2C, since a same frequency can be reused repeatedly in the multiple beams 410A, 410B and 410C different to each other, spectral efficiency can be improved (the number of users accommodated at the same time can be increased). Furtheremore, antenna gain can be increased. Herein, FIG. 2B shows an example in case that the same frequency f0 is repeated for each one of the beams, and FIG. 2C shows an example in case that the same frequency f0 is repeated for each two of the beams. The number of beams, for each of which the same frequency f0 is repeated, is set according to, for example, the directivity (side lobe characteristic, etc.) of the beams. The smaller the repeating number of beams repeating the same frequency f0 is, the more improved the spectral efficiency is.

Figure 3A:
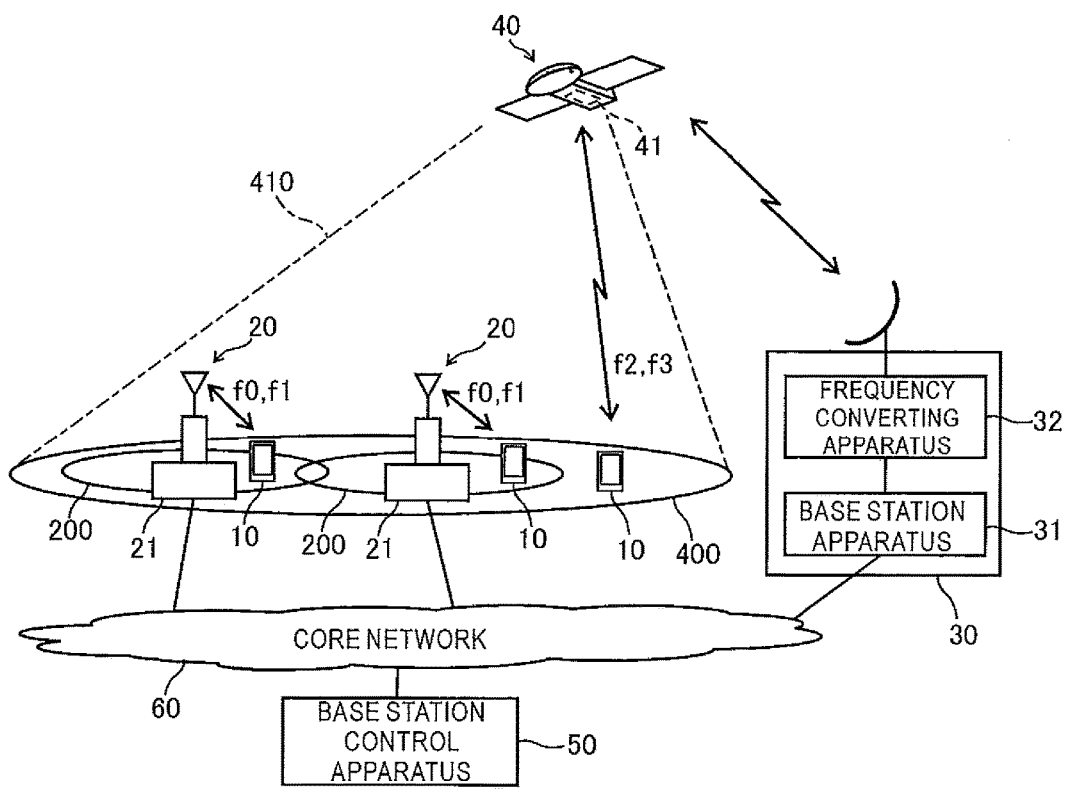
FIG. 3A and FIG. 3B are respectively a schematic diagram of the overall configuration and an explanatory illustration of radio resource allocation showing one example of an allocation control of radio resources in a normal condition of the mobile communication system according to the present embodiment.
Figure 3B:
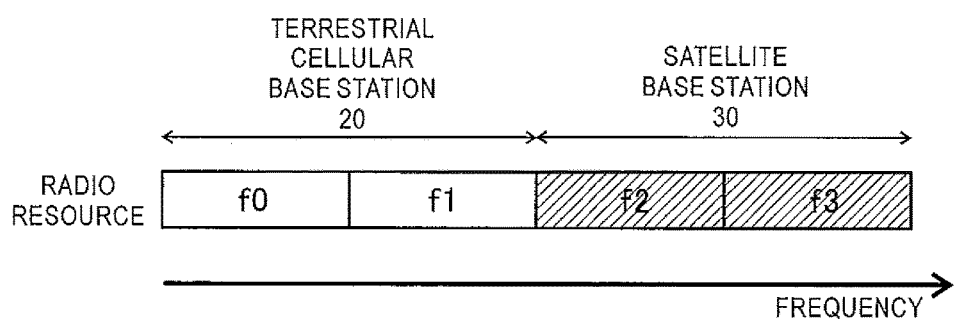

FIG. 3A and FIG. 3B are respectively a schematic diagram of the overall configuration and an explanatory illustration of radio resource allocation showing one example of an allocation control of radio resources in a normal condition of the mobile communication system according to the present embodiment. The present example is an example in which the artificial satellite 40 has a single-beam antenna configuration and multiple terrestrial station areas 200 are overlapped in the single satellite station area (beam area) 400. A predetermined same frequency band shared in the terrestrial cellular mobile communication system and the satellite mobile communication system in the present example is divided into multiple divided frequency bands and each of the divided frequency bands can be allocated as a radio resource. Each of F0, f1, f2 and f3 in the figures shows the center frequency of each of the four consecutive divided frequency bands. It is noted that FIG. 3A and FIG. 3B show the case that the number of divided frequency bands is four, however, the number of divided frequency bands is not limited to that in this example and, for example, the frequency band may be divided into seven divided frequency bands. Moreover, in the description herein, the divide frequency bands with the center frequency of f0, f1, f2 and f3 are appropriately referred to as the frequencies f0, f1, f2 and f3 for short.

In FIG. 3A and FIG. 3B, the base station control apparatus 50 performs a control to allocate the divided frequency bands used in the terrestrial cellular base stations 20 and the divided frequency bands used in the satellite base station 30 so as not to overlap with each other in the predetermined radio communication frame, so that the terrestrial cellular base stations 20 and the satellite base station 30 are synchronized in frequency with each other and the terrestrial cellular base stations 20 and the satellite base station 30 do not interfere with each other. For example, as shown in FIG. 3B, the frequencies f0 and f1 are allocated to the radio resource of the terrestrial cellular mobile communication system used by the terrestrial cellular base stations 20 and the frequencies f2 and f3 are allocated to the radio resource of the satellite mobile communication system used by the satellite base station 30. In the common area where the single satellite station area (beam area) 400 and the terrestrial station areas 200 are overlapped, the mobile station apparatus 10 communicates with the terrestrial cellular base stations 20 at the frequencies f0 and f1 and communicates with the satellite base station 30 at the frequencies f2 and f3. Accordingly, the interference between the terrestrial cellular mobile communication system and the satellite mobile communication system can be prevented more surely.

Furthermore, in FIG. 3A and FIG. 3B, the base station control apparatus 50 may perform a control of allocation rate of the radio resources (frequencies) in the foregoing predetermined radio communication frame of the same frequency band according to a ratio between a communication traffic in the terrestrial cellular base stations 20 and a communication traffic in the satellite base station 30. For example, in case that the communication traffic in the terrestrial cellular base stations 20 is larger than the communication traffic in the satellite base station 30, the frequencies f0, f1 and f2 are allocated to the radio resource of the terrestrial cellular mobile communication system used by the terrestrial cellular base stations 20, and in the opposite case, the frequency f0 is allocated to the radio resource of the satellite mobile communication system used by the satellite base station 30. By controlling the allocation rate of radio resource (frequency) according to the ratio between the communication traffics of the base station 20 and 30 in this way, it is capable of further improving the spectral efficiency in the same frequency band while ensuring the communication between each of the base stations 20 and 30 and the mobile station apparatus 10.

Figure 4A:
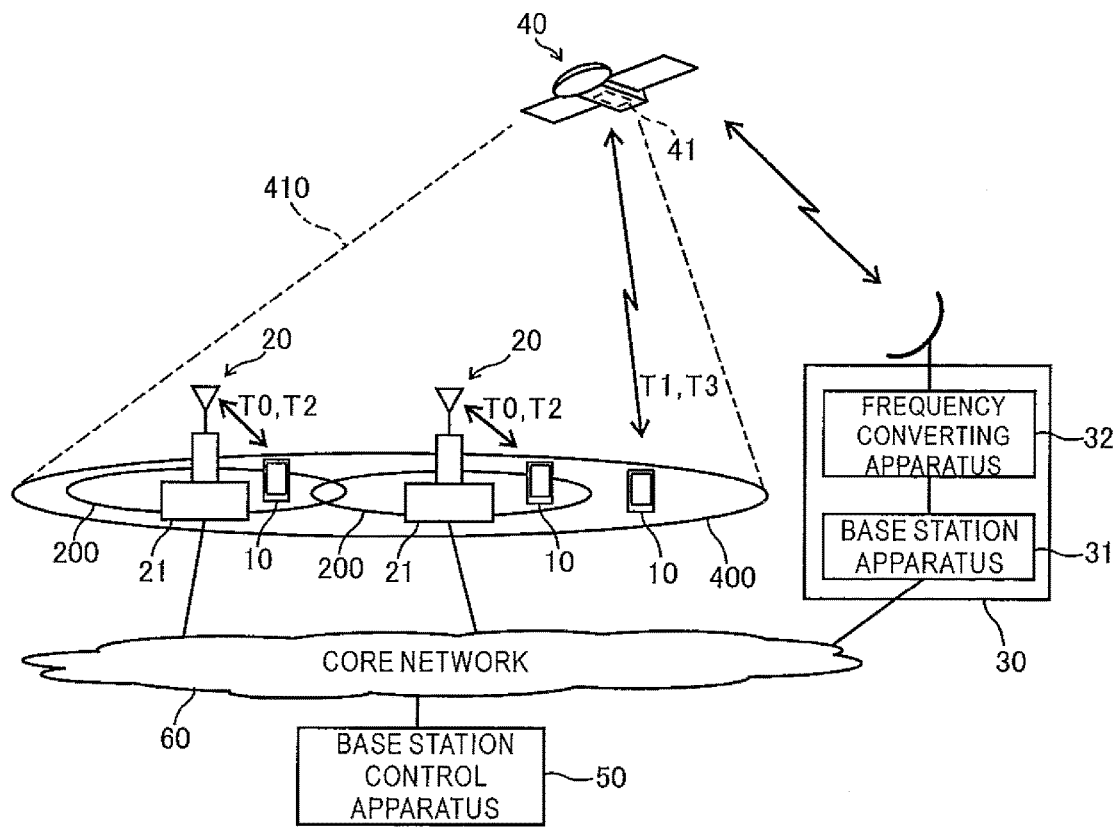
FIG. 4A and FIG. 4B are respectively a schematic diagram of the overall configuration and an explanatory illustration of radio resource allocation showing another example of an allocation control of radio resources in a normal condition of the mobile communication system according to the present embodiment.
Figure 4B:
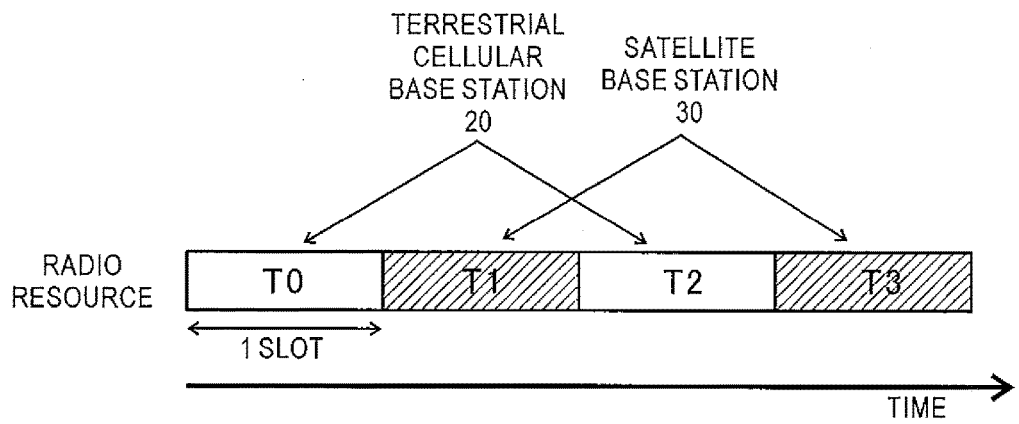

FIG. 4A and FIG. 4B are respectively a schematic diagram of the overall configuration and an explanatory illustration of radio resource allocation showing another example of an allocation control of radio resources in a normal condition of the mobile communication system according to the present embodiment. Similarly to the above-described case in FIG. 3, the present example is an example in which the artificial satellite 40 has a single-beam antenna configuration and multiple terrestrial station areas 200 are overlapped in the single satellite station area (beam area) 400. A predetermined same frequency band shared in the terrestrial cellular mobile communication system and the satellite mobile communication system in the present example is divided into multiple time slots and each of the time slots can be allocated as a radio resource. It is noted that FIG. 4A and FIG. 4B show the case that the number of time slots is four, however, the number of time slots is not limited to that in this example.

In FIG. 4A and FIG. 4B, the base station control apparatus 50 performs a control to allocate the time slots used in the terrestrial cellular base stations 20 and the time slots used in the satellite base station 30 so as not to overlap with each other in the predetermined radio communication frame, so that the terrestrial cellular base stations 20 and the satellite base station 30 are synchronized in time with each other and the terrestrial cellular base stations 20 and the satellite base station 30 do not interfere with each other. For example, as shown in FIG. 4B, the time slots T0 and T2 are allocated to the radio resource of the terrestrial cellular mobile communication system used by the terrestrial cellular base stations 20 and the time slots T1 and T3 are allocated to the radio resource of the satellite mobile communication system used by the satellite base station 30. In the common area where the single satellite station area (beam area) 400 and the terrestrial station areas 200 are overlapped, the mobile station apparatus 10 communicates with the terrestrial cellular base stations 20 at the time slots T0 and T2 and communicates with the satellite base station 30 at the time slots T1 and T3. Accordingly, the interference between the terrestrial cellular mobile communication system and the satellite mobile communication system can be prevented more surely.

Furtheremore, in FIG. 4A and FIG. 4B, the base station control apparatus 50 may perform a control of allocation rate of the radio resources (time slots) in the foregoing predetermined radio communication frame of the same frequency band according to a ratio between a communication traffic in the terrestrial cellular base stations 20 and a communication traffic in the satellite base station 30. For example, in case that the communication traffic in the terrestrial cellular base stations 20 is larger than the communication traffic in the satellite base station 30, the time slots T0, T1 and T2 are allocated to the radio resource of the terrestrial cellular mobile communication system used by the terrestrial cellular base stations 20, and in the opposite case, the time slot T0 is allocated to the radio resource of the satellite mobile communication system used by the satellite base station 30. By controlling the allocation rate of radio resource (time slot) according to the ratio between the communication traffics of the base station 20 and 30 in this way, it is capable of further improving the spectral efficiency in the same frequency band while ensuring the communication between each of the base stations 20 and 30 and the mobile station apparatus 10.

Figure 5A:
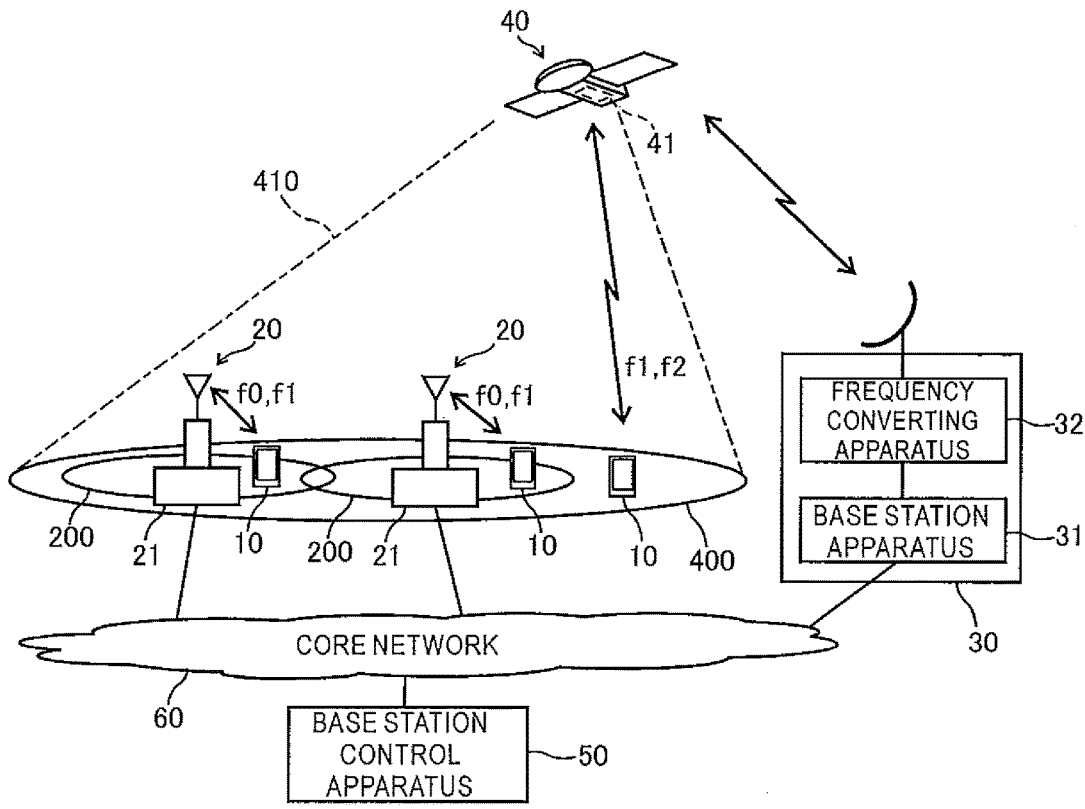
FIG. 5A and FIG. 5B are respectively a schematic diagram of the overall configuration and an explanatory illustration of radio resource allocation showing yet another example of an allocation control of radio resources in a normal condition of the mobile communication system according to the present embodiment.
Figure 5B:
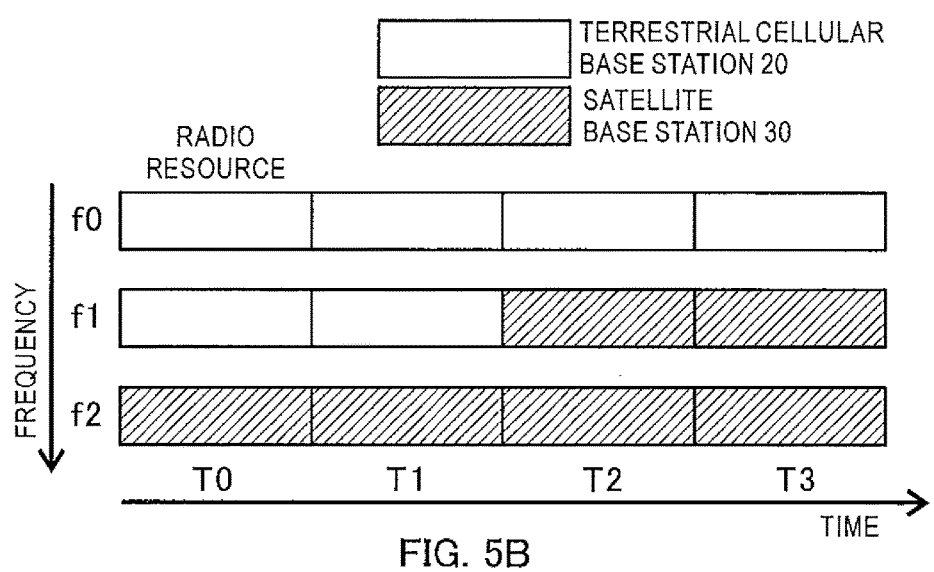

FIG. 5A and FIG. 5B are respectively a schematic diagram of the overall configuration and an explanatory illustration of radio resource allocation showing yet another example of an allocation control of radio resources in a normal condition of the mobile communication system according to the present embodiment. Similarly to the above-described cases in FIGS. 3 and 4, the present example is an example in which the artificial satellite 40 has a single-beam antenna configuration and multiple terrestrial station areas 200 are overlapped in the single satellite station area (beam area) 400. A predetermined same frequency band shared in the terrestrial cellular mobile communication system and the satellite mobile communication system in the present example is divided into multiple frequencies and multiple time slots and each combination of the frequencies and the time slots can be allocated as a radio resource. It is noted that FIG. 5A and FIG. 5B show the case that the number of frequencies is three and the number of time slots is four, however, the number of frequencies and the number of time slots are not limited to those in this example.

In FIG. 5A and FIG. 5B, the base station control apparatus 50 performs a control to allocate the radio resources (frequencies and time slots) used in the terrestrial cellular base stations 20 and the radio resources (frequencies and time slots) used in the satellite base station 30 so as not to overlap with each other in the radio communication frame configured with a combination of predetermined ranges of frequencies and time slots, so that the terrestrial cellular base stations 20 and the satellite base station 30 are synchronized in time and in frequency with each other and the terrestrial cellular base stations 20 and the satellite base station 30 do not interfere with each other. For example, as shown in FIG. 5B, the time slots T0 to T3 at the frequency f0 and the time slots T0 and T1 at the frequency f1 are allocated to the radio resource of the terrestrial cellular mobile communication system used by the terrestrial cellular base stations 20. On the other hand, the time slots T2 and T3 at the frequency f1 and the time slots T0 to T3 at the frequency f2 are allocated to the radio resource of the satellite mobile communication system used by the satellite base station 30. In the common area where the single satellite station area (beam area) 400 and the terrestrial station areas 200 are overlapped, the mobile station apparatus 10 communicates with the terrestrial cellular base stations 20 at the foregoing radio resource (time slots T0 to T3 at frequency f0, time slots T0 and T1 at frequency f1) for terrestrial cellular base stations and communicates with the satellite base station 30 at the foregoing radio resource (time slots T2 and T3 at frequency f1, time slots T0 to T3 at frequency f2) for satellite base station. Accordingly, the interference between the terrestrial cellular mobile communication system and the satellite mobile communication system can be prevented more surely.

Furtheremore, in FIG. 5A and FIG. 5B, the base station control apparatus 50 may perform a control of allocation rate of twelve radio resources in the foregoing predetermined range of radio communication frame according to a ratio between a communication traffic in the terrestrial cellular base stations 20 and a communication traffic in the satellite base station 30. For example, in case that the communication traffic in the terrestrial cellular base stations 20 is larger than the communication traffic in the satellite base station 30, ten radio resources (for example, time slots T0 to T3 at frequency f0, and time slots T0 and T1 at frequency f1) are allocated to the radio resource of the terrestrial cellular mobile communication system used by the terrestrial cellular base stations 20. In the opposite case, two radio resources (for example, time slots T0 and T1 at frequency f0) are allocated to the radio resource of the satellite mobile communication system used by the satellite base station 30. By controlling the allocation rate of radio resource (frequency, time slot) according to the ratio between the communication traffics of the base station 20 and 30 in this way, it is capable of further improving the spectral efficiency in the same frequency band while ensuring the communication between each of the base stations 20 and 30 and the mobile station apparatus 10.

FIG. 6A is a schematic diagram of the overall configuration showing yet another example of an allocation control of radio resources in a normal condition of the mobile communication system according to the present embodiment. FIG. 6B and FIG. 6C are respectively explanatory illustrations of the allocation of radio resources in the present example. Differently from the above-described cases in FIGS. 3 to 5, the present example is an example in which the artificial satellite 40 has a multi-beam antenna configuration and multiple terrestrial station areas 200A and 200B are overlapped in each of the multiple satellite station areas (beam areas) 400A and 400B. In the example shown in the figure, three terrestrial station areas 200A are overlapped in a first satellite station area 400A and two terrestrial station areas 200B are overlapped in a second satellite station area 400B. It is noted that, in the present example, with respect to parts in common with those in the aforementioned example in FIG. 3, the description will be omitted.

In FIG. 6A to FIG. 6C, the base station control apparatus 50 independently performs a control of allocation rate of the radio resources (frequencies) for each of the satellite station areas (beam areas) 400A and 400B. Specifically, the base station control apparatus 50 performs a control to allocate the divided frequency bands used in the terrestrial cellular base stations 20A and the divided frequency bands used in the first beam 410A of the satellite base station 30 so as not to overlap with each other in the predetermined radio communication frame, so that the terrestrial cellular base stations 20A and the satellite base station 30 are synchronized in frequency with each other and the terrestrial cellular base stations 20A and the satellite base station 30 do not interfere with each other. For example, as shown in FIG. 6B, the frequencies f0, f1 and f2 are allocated to the radio resources of the terrestrial cellular mobile communication system used by the terrestrial cellular base stations 20A and the frequency f3 is allocated to the radio resource of the satellite mobile communication system used by the satellite base station 30 via the first beam 410A.

Furtheremore, the base station control apparatus 50 performs a control to allocate the divided frequency bands used in the terrestrial cellular base stations 20B and the divided frequency bands used in the second beam 410B of the satellite base station 30 so as not to overlap with each other in the predetermined radio communication frame, so that the terrestrial cellular base stations 20B and the satellite base station 30 are synchronized in frequency with each other and the terrestrial cellular base stations 20B and the satellite base station 30 do not interfere with each other. For example, as shown in FIG. 6C, the frequencies f0 and f1 are allocated to the radio resources of the terrestrial cellular mobile communication system used by the terrestrial cellular base stations 20B and the frequencies f2 and f3 are allocated to the radio resources of the satellite mobile communication system used by the satellite base station 30 via the second beam 410B.

In the common area where the first satellite station area (beam area) 400A and the terrestrial station areas 200A are overlapped, the mobile station apparatus 10 communicates with the terrestrial cellular base stations 20A at the frequencies f0, f1 and f2, and communicates with the satellite base station 30 at the frequency f3. In the common area where the second satellite station area (beam area) 400B and the terrestrial station areas 200B are overlapped, the mobile station apparatus 10 communicates with the terrestrial cellular base stations 20B at the frequencies f0 and f1, and communicates with the satellite base station 30 at the frequencies f2 and f3. Accordingly, in each of the satellite station areas (beam areas) 400A and 400B, the interference between the terrestrial cellular mobile communication system and the satellite mobile communication system can be prevented more surely.

Moreover, in FIG. 6A to FIG. 6C, the base station control apparatus 50 may perform a control of allocation rate of the radio resources (frequencies) in the foregoing predetermined radio communication frame of the same frequency band according to a ratio between a communication traffic in the terrestrial cellular base stations 20 and a communication traffic in the satellite base station 30, in each of the satellite station areas (beam areas) 400A and 400B. For example, in case that the communication traffic in the terrestrial cellular base stations 20A is larger than the communication traffic in the satellite base station 30, as shown in FIG. 6B, the frequencies f0, f1 and f2 are allocated to the radio resource of the terrestrial cellular mobile communication system used by the terrestrial cellular base stations 20A, and in the opposite case, the frequency f0 is allocated to the radio resource of the terrestrial cellular mobile communication system used by the terrestrial cellular base stations 20A. Further, in case that the communication traffic in the terrestrial cellular base stations 20B is larger than the communication traffic in the satellite base station 30, the frequencies f0, f1 and f2 are allocated to the radio resource of the terrestrial cellular mobile communication system used by the terrestrial cellular base stations 20B, and in the opposite case, the frequency f0 is allocated to the radio resource of the terrestrial cellular mobile communication system used by the terrestrial cellular base stations 20B. Accordingly, in each of the satellite station areas (beam areas) 400A and 400B, it is capable of further improving the spectral efficiency in the same frequency band while ensuring the communication between each of the base stations 20A, 20B and 30, and the mobile station apparatus 10.

FIG. 7A is a schematic diagram of the overall configuration showing yet another example of an allocation control of radio resources in a normal condition of the mobile communication system according to the present embodiment. FIG. 7B and FIG. 7C are respectively explanatory illustrations of the allocation of radio resources in the present example. Differently from the above-described cases in FIGS. 3 to 5, the present example is an example in which the artificial satellite 40 has a multi-beam antenna configuration and multiple terrestrial station areas 200A and 200B are overlapped in each of the multiple satellite station areas (beam areas) 400A and 400B. It is noted that, in the present example, with respect to parts in common with those in the aforementioned examples in FIG. 4 and FIG. 6, the description will be omitted.

In FIG. 7A to FIG. 7C, the base station control apparatus 50 independently performs a control of allocation rate of the radio resources (time slots) for each of the satellite station areas (beam areas) 400A and 400B. Specifically, the base station control apparatus 50 performs a control to allocate the time slots used in the terrestrial cellular base stations 20A and the time slots used in the first beam 410A of the satellite base station 30 so as not to overlap with each other in the predetermined radio communication frame, so that the terrestrial cellular base stations 20A and the satellite base station 30 are synchronized in time with each other and the terrestrial cellular base stations 20A and the satellite base station 30 do not interfere with each other. For example, as shown in FIG. 7B, the time slots T0, T1 and T2 are allocated to the radio resources of the terrestrial cellular mobile communication system used by the terrestrial cellular base stations 20A and the time slot T3 is allocated to the radio resource of the satellite mobile communication system used by the satellite base station 30 via the first beam 410A.

Furtheremore, the base station control apparatus 50 performs a control to allocate the time slots used in the terrestrial cellular base stations 20B and the time slots used in the second beam 410B of the satellite base station 30 so as not to overlap with each other in the predetermined radio communication frame, so that the terrestrial cellular base stations 20B and the satellite base station 30 are synchronized in time with each other and the terrestrial cellular base stations 20B and the satellite base station 30 do not interfere with each other. For example, as shown in FIG. 7C, the time slots T0 and T1 are allocated to the radio resources of the terrestrial cellular mobile communication system used by the terrestrial cellular base stations 20B and the time slots T2 and T3 are allocated to the radio resources of the satellite mobile communication system used by the satellite base station 30 via the second beam 410B.

In the common area where the first satellite station area (beam area) 400A and the terrestrial station areas 200A are overlapped, the mobile station apparatus 10 communicates with the terrestrial cellular base stations 20A at the time slots T0, T1 and T2, and communicates with the satellite base station 30 at the time slot T3. In the common area where the second satellite station area (beam area) 400B and the terrestrial station areas 200B are overlapped, the mobile station apparatus 10 communicates with the terrestrial cellular base stations 20B at the time slots T0 and T1, and communicates with the satellite base station 30 at the time slots T2 and T3. Accordingly, in each of the satellite station areas (beam areas) 400A and 400B, the interference between the terrestrial cellular mobile communication system and the satellite mobile communication system can be prevented more surely.

Moreover, in FIG. 7A to FIG. 7C, the base station control apparatus 50 may perform a control of allocation rate of the radio resources (time slots) in the foregoing predetermined radio communication frame of the same frequency band according to a ratio between a communication traffic in the terrestrial cellular base stations 20 and a communication traffic in the satellite base station 30, in each of the satellite station areas (beam areas) 400A and 400B. For example, in case that the communication traffic in the terrestrial cellular base stations 20A is larger than the communication traffic in the satellite base station 30, as shown in FIG. 7B, the time slots T0, T1 and T2 are allocated to the radio resource of the terrestrial cellular mobile communication system used by the terrestrial cellular base stations 20A, and in the opposite case, the time slot T0 is allocated to the radio resource of the terrestrial cellular mobile communication system used by the terrestrial cellular base stations 20A. Further, in case that the communication traffic in the terrestrial cellular base stations 20B is larger than the communication traffic in the satellite base station 30, the time slots T0, T1 and T2 are allocated to the radio resource of the terrestrial cellular mobile communication system used by the terrestrial cellular base stations 20B, and in the opposite case, the time slot T0 is allocated to the radio resource of the terrestrial cellular mobile communication system used by the terrestrial cellular base stations 20B. Accordingly, in each of the satellite station areas (beam areas) 400A and 400B, it is capable of further improving the spectral efficiency in the same frequency band while ensuring the communication between each of the base stations 20A, 20B and 30 and the mobile station apparatus 10.

Figures 8A, 8B, 8C:
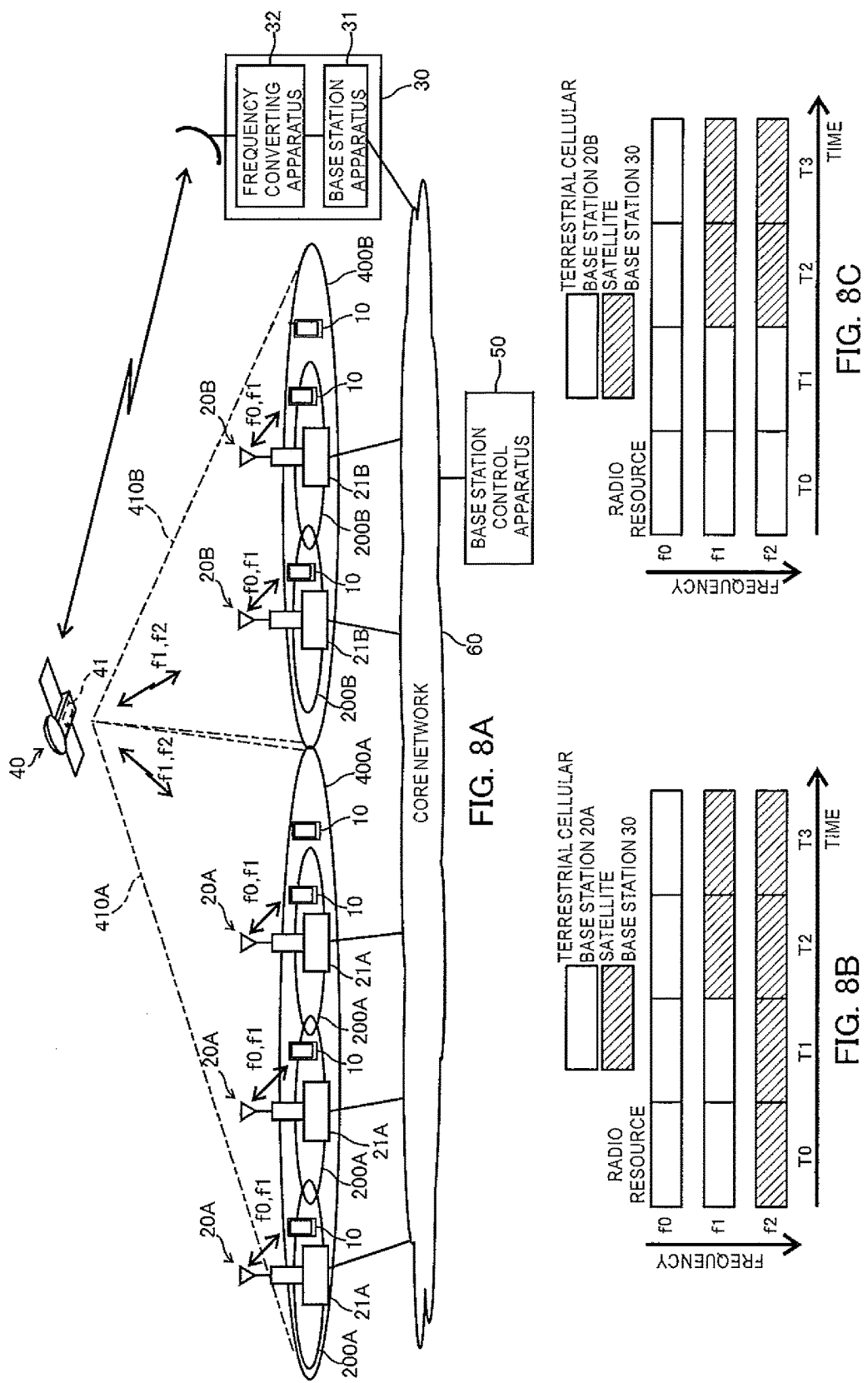
FIG. 8A is a schematic diagram of the overall configuration showing yet another example of an allocation control of radio resources in a normal condition of the mobile communication system according to the present embodiment.
FIG. 8B and FIG. 8C are respectively explanatory illustrations of the allocation of radio resources in the present example.

FIG. 8A is a schematic diagram of the overall configuration showing yet another example of an allocation control of radio resources in a normal condition of the mobile communication system according to the present embodiment. FIG. 8B and FIG. 8C are respectively explanatory illustrations of the allocation of radio resources in the present example. Differently from the above-described cases in FIGS. 3 to 5, the present example is an example in which the artificial satellite 40 has a multi-beam antenna configuration and multiple terrestrial station areas 200A and 200B are overlapped in each of the multiple satellite station areas (beam areas) 400A and 400B. It is noted that, in the present example, with respect to parts in common with those in the aforementioned examples in FIG. 5 to FIG. 7, the description will be omitted.

In FIG. 8A to FIG. 8C, the base station control apparatus 50 independently performs a control of allocation rate of the radio resources (frequencies and time slots) for each of the satellite station areas (beam areas) 400A and 400B. Specifically, the base station control apparatus 50 performs a control to allocate the radio resources (frequencies, time slots) used in the terrestrial cellular base stations 20A and the radio resources (frequencies, time slots) used in the first beam 410A of the satellite base station 30 so as not to overlap with each other in the radio communication frame configured with a combination of predetermined ranges of frequencies and time slots, so that the terrestrial cellular base stations 20A and the satellite base station 30 are synchronized in time and in frequency with each other and the terrestrial cellular base stations 20A and the satellite base station 30 do not interfere with each other. For example, as shown in FIG. 8B, the time slots T0 to T3 at the frequency f0 and the time slots T0 and T1 at the frequency f1 are allocated to the radio resources of the terrestrial cellular mobile communication system used by the terrestrial cellular base stations 20A. On the other hand, the time slots T2 and T3 at the frequency f1 and the time slots T0 to T3 at the frequency f2 are allocated to the radio resource of the satellite mobile communication system used by the satellite base station 30 via the first beam 410A.

Furthermore, the base station control apparatus 50 performs a control to allocate the radio resources (frequencies, time slots) used in the terrestrial cellular base stations 20B and the radio resources (frequencies, time slots) used in the second beam 410B of the satellite base station 30 so as not to overlap with each other in the radio communication frame configured with a combination of predetermined ranges of frequencies and time slots, so that the terrestrial cellular base stations 20B and the satellite base station 30 are synchronized in time and in frequency with each other and the terrestrial cellular base stations 20B and the satellite base station 30 do not interfere with each other. For example, as shown in FIG. 8C, the time slots T0 to T3 at the frequency f0 and the time slots T0 and T1 at the frequency f1 are allocated to the radio resources of the terrestrial cellular mobile communication system used by the terrestrial cellular base stations 20B. On the other hand, the time slots T2 and T3 at the frequency f1 and the time slots T2 and T3 at the frequency f2 are allocated to the radio resource of the satellite mobile communication system used by the satellite base station 30 via the second beam 410B.

In the common area where the first satellite station area (beam area) 400A and the terrestrial station areas 200A are overlapped, the mobile station apparatus 10 communicates with the terrestrial cellular base stations 20A at the foregoing radio resource (time slots T0 to T3 at frequency f0, time slots T0 and T1 at frequency f1) for terrestrial cellular base stations and communicates with the satellite base station 30 at the foregoing radio resource (time slots T2 and T3 at frequency f1, time slots T0 to T3 at frequency f2) for satellite base station. In the common area where the second satellite station area (beam area) 400B and the terrestrial station areas 200B are overlapped, the mobile station apparatus 10 communicates with the terrestrial cellular base stations 20B at the foregoing radio resource (time slots T0 to T3 at frequency f0, time slots T0 and T1 at frequencies f1 and f2) for terrestrial cellular base stations and communicates with the satellite base station 30 at the foregoing radio resource (time slots T2 and T3 at frequencies f1 and f2) for satellite base station. Accordingly, in each of the satellite station areas (beam areas) 400A and 400B, the interference between the terrestrial cellular mobile communication system and the satellite mobile communication system can be prevented more surely.

Moreover, in FIG. 8A to FIG. 8C, the base station control apparatus 50 may perform a control of allocation rate of the radio resources (frequencies and time slots) in the foregoing predetermined radio communication frame of the same frequency band according to a ratio between a communication traffic in the terrestrial cellular base stations 20 and a communication traffic in the satellite base station 30, in each of the satellite station areas (beam areas) 400A and 400B. For example, in case that the communication traffic in the terrestrial cellular base stations 20A is larger than the communication traffic in the satellite base station 30, ten radio resources (for example, time slots T0 to T3 at frequencies f0 and f1, and time slots T0 and T1 at frequency f2) are allocated to the radio resource of the terrestrial cellular mobile communication system used by the terrestrial cellular base stations 20A. In the opposite case, two radio resources (for example, time slots T0 and T1 at frequency f0) are allocated to the radio resource of the terrestrial cellular mobile communication system used by the terrestrial cellular base stations 20A. Further, in case that the communication traffic in the terrestrial cellular base stations 20B is larger than the communication traffic in the satellite base station 30, eight radio resources (for example, time slots T0 to T3 at frequencies f0 and f1) are allocated to the radio resource of the terrestrial cellular mobile communication system used by the terrestrial cellular base stations 20B. In the opposite case, four radio resources (for example, time slots T0 to T3 at frequencies f0) are allocated to the radio resource of the terrestrial cellular mobile communication system used by the terrestrial cellular base stations 20B. Accordingly, in each of the satellite station areas (beam areas) 400A and 400B, it is capable of further improving the spectral efficiency in the same frequency band while ensuring the communication between each of the base stations 20A, 20B and 30 and the mobile station apparatus 10.

A control of radio resource allocation in an emergent condition in which a failure occurs in some of the terrestrial cellular base stations in the common area by a disaster and so on in the mobile communication system of the present embodiment will be then described.

FIG. 9 are illustrations showing one example of an allocation control of radio resources (frequencies) in a normal condition and in an emergent condition in a common area in case that a satellite used for satellite mobile communications has a single-beam antenna configuration in the mobile communication system according to the present embodiment. It is noted that, in FIG. 9, with respect to parts in common with those in the aforementioned FIGS. 3A and 3B, the description will be omitted.

Figure 9C:
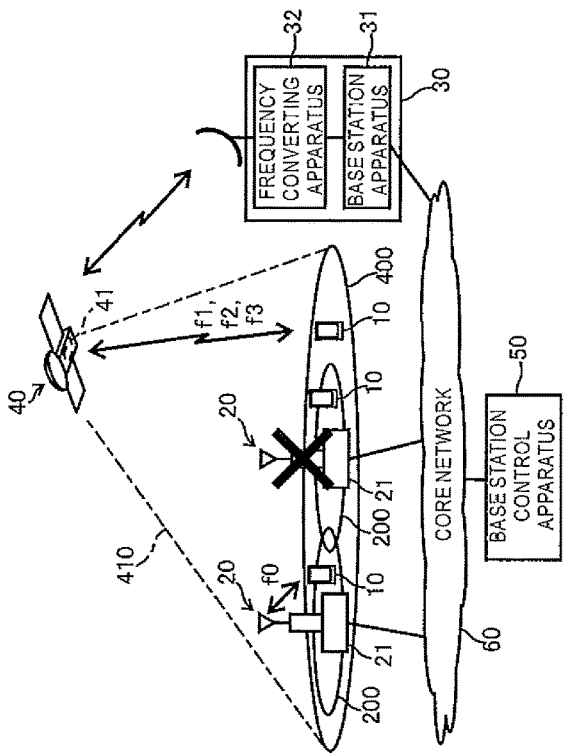
FIG. 9A to FIG. 9D are illustrations showing one example of an allocation control of radio resources (frequencies) in a normal condition and in an emergent condition in a common area in case that a satellite used for satellite mobile communications has a single-beam antenna configuration in the mobile communication system according to the present embodiment.
Figure 9D:
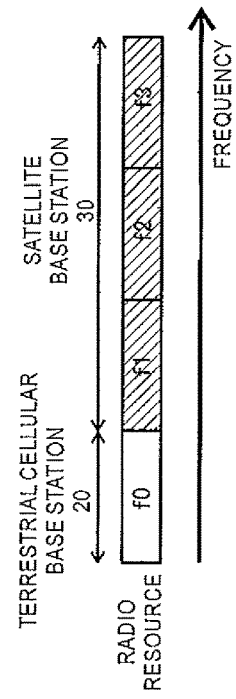
Figure 9A:
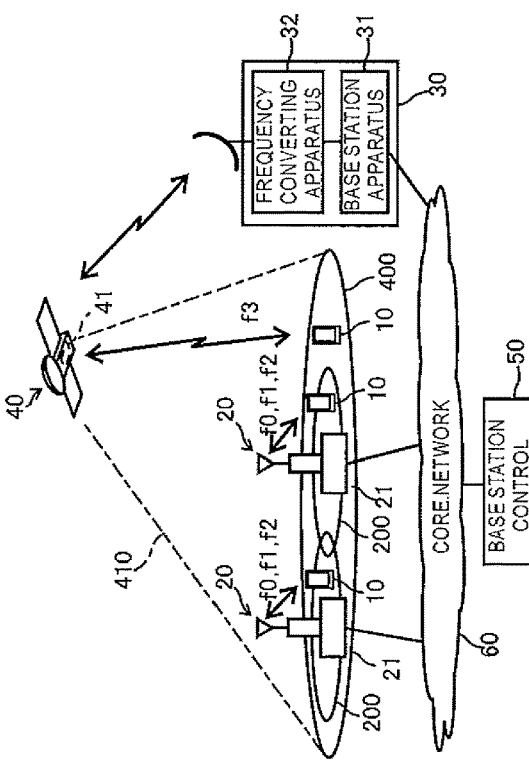
Figure 9B:
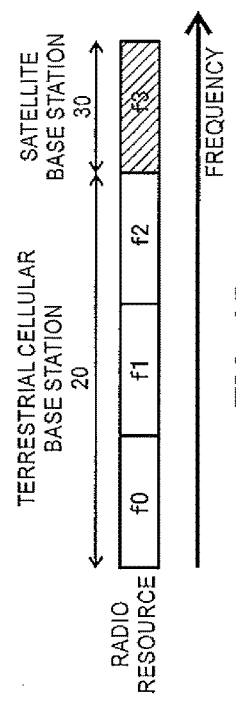

FIGS. 9A and 9B are respectively a schematic diagram of overall configuration and an explanatory illustration of allocation control of radio resources (frequencies) showing one example of an allocation control of radio resources (frequencies) in a normal condition in the mobile communication system according to the present embodiment. In the normal condition, the base station control apparatus 50 performs a control to allocate the divided frequency bands used in the terrestrial cellular base stations 20 and the divided frequency bands used in the satellite base station 30 so as not to overlap with each other, so that the terrestrial cellular base stations 20 and the satellite base station 30 do not interfere with each other in the common area. Specifically, in the present example, since the rate of communication traffic of the terrestrial cellular mobile communication system by the terrestrial cellular base stations 20 is high, the frequencies f0, f1 and f2 are allocated to the radio resources and the frequency f3 is allocated to the radio resource of the satellite mobile communication system by the satellite base station 30.

On the other hands, FIGS. 9C and 9D are respectively a schematic diagram of overall configuration and an explanatory illustration of allocation control of radio resources (frequencies) showing one example of an allocation control of radio resources (frequencies) in an emergent normal condition in which a failure occurs in one of the two terrestrial cellular base stations 20 in the mobile communication system according to the present embodiment. In the emergent condition of the present example, a failure occurs in one of the terrestrial cellular base stations 20 indicated with a mark of X due to, for example, a disaster such as an earthquake, and the rate of communication traffic of the terrestrial cellular mobile communication system by the terrestrial cellular base stations 20 decreases. Accordingly, the base station control apparatus 50 controls so as to decrease the number of divided frequencies allocated to the terrestrial cellular mobile communication system and increase the number of divided frequencies allocated to the satellite mobile communication system. For example, as shown in FIG. 9D, the frequency f0 is allocated to the radio resource of the terrestrial cellular mobile communication system and the frequencies f1, f2 and f3 are allocated to the radio resources of the satellite mobile communication system. By this way, while maintaining the spectral efficiency used for mobile communications, mobile communication services with the mobile station apparatus 10 can be surely used in the common area.

FIG. 10 are illustrations showing another example of an allocation control of radio resources (time slots) in a normal condition and in an emergent condition in a common area in case that a satellite used for satellite mobile communications has a single-beam antenna configuration in the mobile communication system according to the present embodiment. It is noted that, in FIG. 10, with respect to parts in common with those in the aforementioned FIGS. 4A and 4B, the description will be omitted.

FIGS. 10A and 10B are respectively a schematic diagram of overall configuration and an explanatory illustration of allocation control of radio resources (time slots) showing one example of an allocation control of radio resources (time slots) in a normal condition in the mobile communication system according to the present embodiment. In the normal condition, the base station control apparatus 50 performs a control to allocate the time slots used in the terrestrial cellular base stations 20 and the time slots used in the satellite base station 30 so as not to overlap with each other, so that the terrestrial cellular base stations 20 and the satellite base station 30 do not interfere with each other in the common area. Specifically, in the present example, since the rate of communication traffic of the terrestrial cellular mobile communication system by the terrestrial cellular base stations 20 is high, the time slots T0, T1 and T2 are allocated to the radio resources and the time slot T3 is allocated to the radio resource of the satellite mobile communication system by the satellite base station 30. By this way, the spectral efficiency used for mobile communications is improved.

On the other hands, FIGS. 10C and 10D are respectively a schematic diagram of overall configuration and an explanatory illustration of allocation control of radio resources (time slots) showing one example of an allocation control of radio resources (time slots) in an emergent normal condition in which a failure occurs in one of the two terrestrial cellular base stations 20 in the mobile communication system according to the present embodiment. In the emergent condition of the present example, a failure occurs in one of the terrestrial cellular base stations 20 indicated with a mark of X due to, for example, a disaster such as an earthquake, and the rate of communication traffic of the terrestrial cellular mobile communication system by the terrestrial cellular base stations 20 decreases. Accordingly, the base station control apparatus 50 controls so as to decrease the number of time slots allocated to the terrestrial cellular mobile communication system and increase the number of time slots allocated to the satellite mobile communication system. For example, as shown in FIG. 10D, the time slot T0 is allocated to the radio resource of the terrestrial cellular mobile communication system and the time slots T1, T2 and T3 are allocated to the radio resources of the satellite mobile communication system. By this way, while maintaining the spectral efficiency used for mobile communications, mobile communication services with the mobile station apparatus 10 can be surely used in the common area.

FIG. 11 are illustrations showing yet another example of an allocation control of radio resources (frequencies and time slots) in a normal condition and in an emergent condition in a common area in case that a satellite used for satellite mobile communications has a single-beam antenna configuration in the mobile communication system according to the present embodiment. It is noted that, in FIG. 11, with respect to parts in common with those in the aforementioned FIGS. 5A and 5B, the description will be omitted.

Figure 11A:
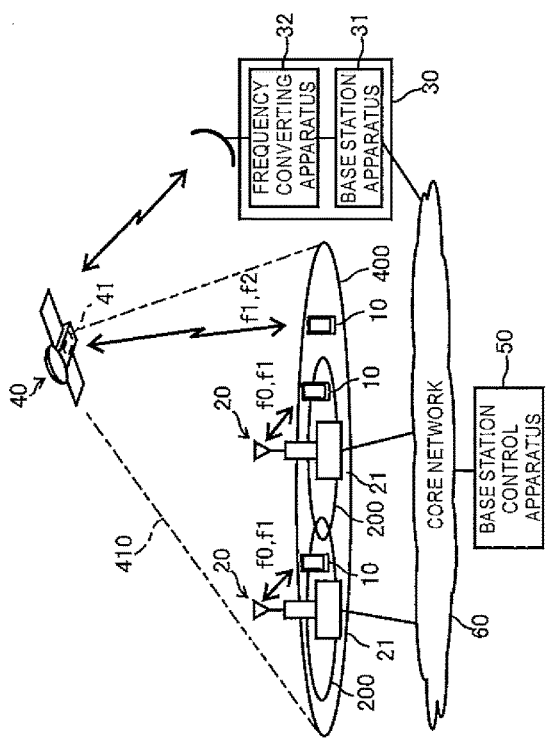
FIG. 11A to FIG. 11D are illustrations showing yet another example of an allocation control of radio resources (frequencies and time slots) in a normal condition and in an emergent condition in a common area in case that a satellite used for satellite mobile communications has a single-beam antenna configuration in the mobile communication system according to the present embodiment.
Figure 11B:
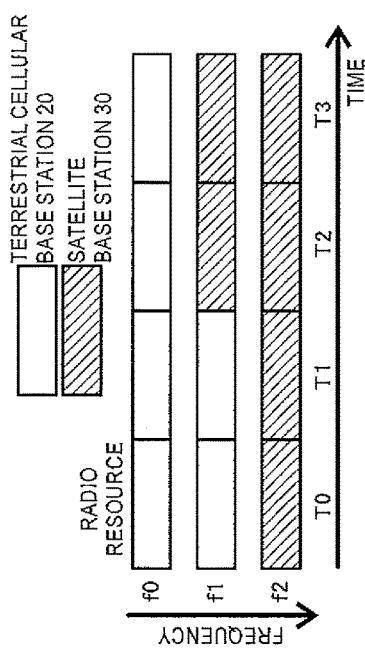

FIGS. 11A and 11B are respectively a schematic diagram of overall configuration and an explanatory illustration of allocation control of radio resources (frequencies and time slots) showing one example of an allocation control of radio resources (frequencies and time slots) in a normal condition in the mobile communication system according to the present embodiment. In the normal condition, the base station control apparatus 50 performs a control to allocate the radio resources used in the terrestrial cellular base stations 20 and the radio resources used in the satellite base station 30 so as not to overlap with each other, so that the terrestrial cellular base stations 20 and the satellite base station 30 do not interfere with each other in the common area. Specifically, in the present example, since the rate of communication traffic of the terrestrial cellular mobile communication system by the terrestrial cellular base stations 20 and the rate of communication traffic of the terrestrial cellular mobile communication system by the terrestrial cellular base stations 20 are equal or almost equal to each other, the same six numbers of radio resources are allocated to the respective radio resources of the terrestrial cellular mobile communication system and the satellite mobile communication system by the satellite base station 30. By this way, the spectral efficiency used for mobile communications is improved.

Figure 11C:
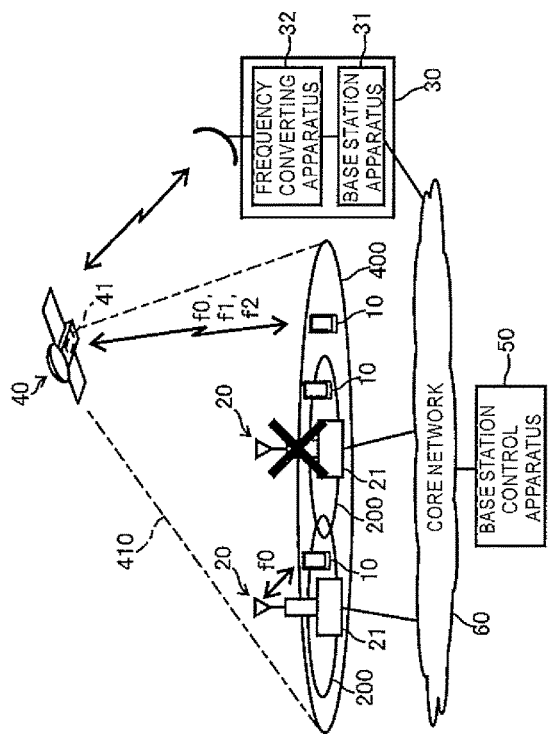
Figure 11D:
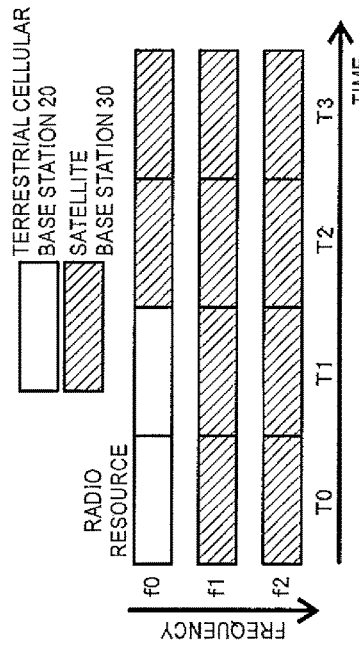

On the other hands, FIGS. 11C and 11D are respectively a schematic diagram of overall configuration and an explanatory illustration of allocation control of radio resources (frequencies and time slots) showing one example of an allocation control of radio resources (frequencies and time slots) in an emergent normal condition in which a failure occurs in one of the two terrestrial cellular base stations 20 in the mobile communication system according to the present embodiment. In the emergent condition of the present example, a failure occurs in one of the terrestrial cellular base stations 20 indicated with a mark of X due to, for example, a disaster such as an earthquake, and there is a situation capable of not communicating with the terrestrial cellular mobile communication system by the terrestrial cellular base stations 20. In such case, communications in the failure generating area are secured by satellite communications. At first, to address the increase of satellite communication traffics in the failure generating area, the base station control apparatus 50 controls to decrease the number of radio resources allocated to the terrestrial cellular mobile communication system and increase the number of radio resources allocated to the satellite mobile communication system. For example, as shown in FIG. 11D, two radio resources (time slots T0 and T1 at frequency f0) are allocated to the radio resources of the terrestrial cellular mobile communication system and ten radio resources (time slots T2 and T3 at frequency f0, and time slots T0 to T3 at frequencies f1 and f2) are allocated to the radio resources of the satellite mobile communication system. By this way, while maintaining the spectral efficiency used for mobile communications, mobile communication services with the mobile station apparatus 10 can be surely used in the common area.

FIG. 12 are illustrations showing one example of an allocation control of radio resources (frequencies) in a normal condition and in an emergent condition in a common area in case that a satellite used for satellite mobile communications has a multi-beam antenna configuration in the mobile communication system according to the present embodiment. It is noted that, in FIG. 12, with respect to parts in common with those in the aforementioned FIGS. 6A and 6B, the description will be omitted.

Figures 12A, 12B, 12C:
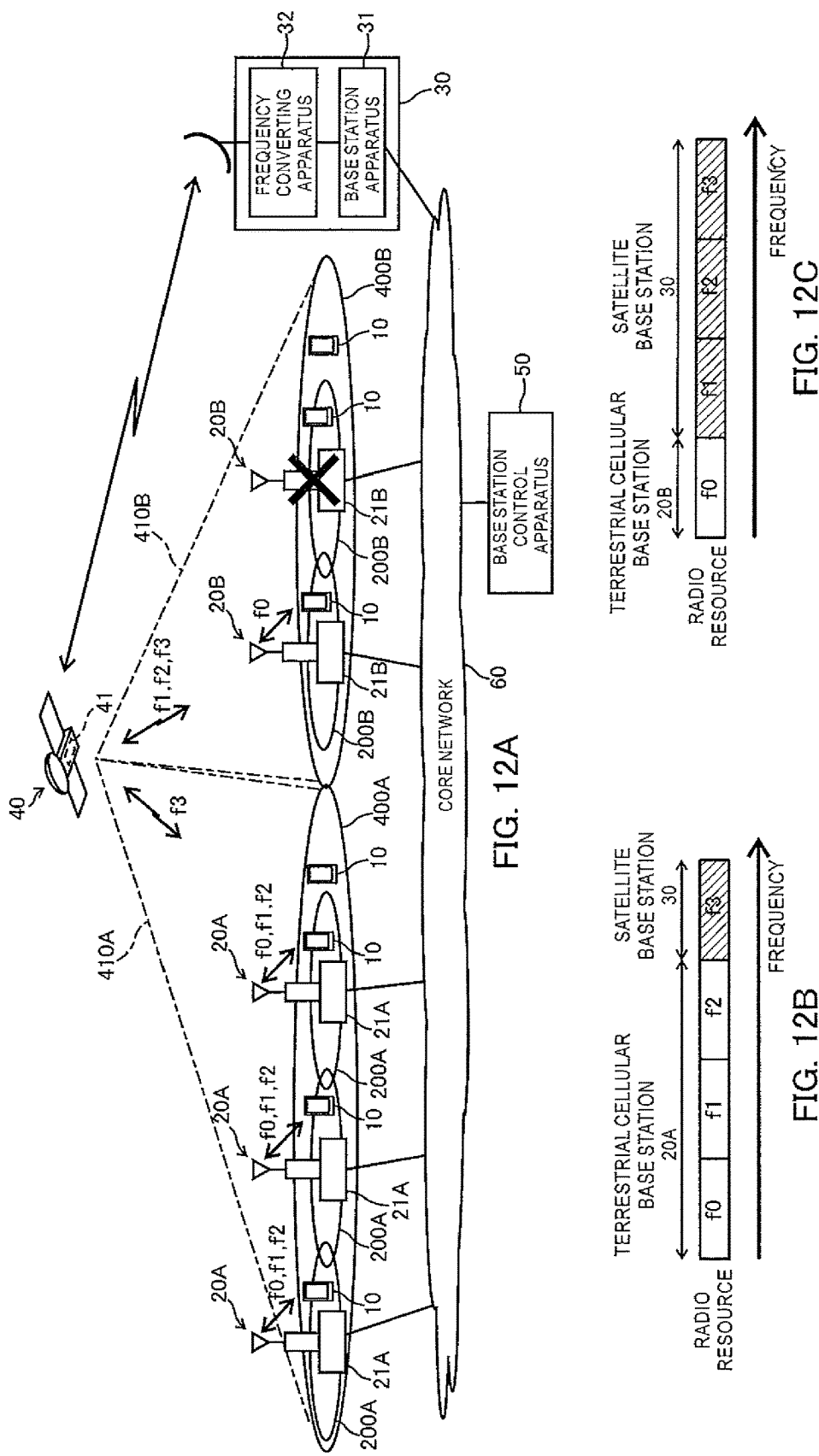
FIG. 12A to FIG. 12C are illustrations showing one example of an allocation control of radio resources (frequencies and time slots) in a normal condition and in an emergent condition in a common area in case that a satellite used for satellite mobile communications has a multi-beam antenna configuration in the mobile communication system according to the present embodiment.

FIG. 12A is a schematic diagram of overall configuration showing one example of an allocation control of radio resources (frequencies) in two common areas adjacent to each other in the mobile communication system according to the present embodiment. FIG. 12B is an explanatory illustration of allocation control of radio resources (frequencies) in a first common area overlapped between the terrestrial station area 200A in a normal condition and the first satellite station area 400A. FIG. 12C is an explanatory illustration of allocation control of radio resources (frequencies) in a second common area overlapped between the terrestrial station area 200B in an emergent condition and the second satellite station area 400B.

The first common area in the normal condition in FIG. 12A is, for example, a non-disaster generating area, in which the rate of communication traffic of the terrestrial cellular mobile communication system by the terrestrial cellular base stations 20A is high. Accordingly, as shown in FIG. 12B, the frequencies f0, f1 and f2 are allocated to the radio resources of the terrestrial cellular mobile communication system and the frequency f3 is allocated to the radio resource of the satellite mobile communication system by the satellite base station 30.

On the other hands, the second common area in the emergent condition in FIG. 12A is, for example, a disaster generating area (disaster afflicted area) where a disaster such as an earthquake occurs, in which a failure occurs in one of the terrestrial cellular base stations 20B and the communication by the mobile station apparatus 10 in the failure generating area is covered with the satellite mobile communication system. Accordingly, as shown in FIG. 12C, the frequency f0 is allocated to the radio resource of the terrestrial cellular mobile communication system and the frequencies f1, f2 and f3 are allocated to the radio resources of the satellite mobile communication system. By this way, in the second common area in the emergent condition where a failure occurs in the terrestrial cellular mobile communication system, while maintaining the spectral efficiency used for mobile communications, mobile communication services with the mobile station apparatus 10 can be surely used in the common area. Furtheremore, in the first common area where a disaster does not occur, it is capable of maintaining the communications in the normal condition.

FIG. 13 are illustrations showing another example of an allocation control of radio resources (time slots) in a normal condition and in an emergent condition in a common area in case that a satellite used for satellite mobile communications has a multi-beam antenna configuration in the mobile communication system according to the present embodiment. It is noted that, in FIG. 13, with respect to parts in common with those in the aforementioned FIGS. 7A and 7B, the description will be omitted.

FIG. 13A is a schematic diagram of overall configuration showing one example of an allocation control of radio resources (time slots) in two common areas adjacent to each other in the mobile communication system according to the present embodiment. FIG. 13B is an explanatory illustration of allocation control of radio resources (time slots) in a first common area overlapped between the terrestrial station area 200A in a normal condition and the first satellite station area 400A. FIG. 13C is an explanatory illustration of allocation control of radio resources (time slots) in a second common area overlapped between the terrestrial station area 200B in an emergent condition and the second satellite station area 400B.

The first common area in the normal condition in FIG. 13A is, for example, a non-disaster generating area, in which the rate of communication traffic of the terrestrial cellular mobile communication system by the terrestrial cellular base stations 20A is high. Accordingly, as shown in FIG. 13B, the time slots T0, T1 and T2 are allocated to the radio resources of the terrestrial cellular mobile communication system and the time slot T3 is allocated to the radio resource of the satellite mobile communication system by the satellite base station 30.

On the other hands, the second common area in the emergent condition in FIG. 13A is, for example, a disaster generating area (disaster afflicted area) where a disaster such as an earthquake occurs, in which a failure occurs in one of the terrestrial cellular base stations 20B and the communication by the mobile station apparatus 10 in the failure generating area is covered with the satellite mobile communication system. Accordingly, as shown in FIG. 13C, the time slot T0 is allocated to the radio resource of the terrestrial cellular mobile communication system and the time slots T1, T2 and T3 are allocated to the radio resources of the satellite mobile communication system. By this way, in the second common area in the emergent condition where a failure occurs in the terrestrial cellular mobile communication system, while maintaining the spectral efficiency used for mobile communications, mobile communication services with the mobile station apparatus 10 can be surely used in the common area.

FIG. 14 are illustrations showing yet another example of an allocation control of radio resources (time slots) in a normal condition and in an emergent condition in a common area in case that a satellite used for satellite mobile communications has a multi-beam antenna configuration in the mobile communication system according to the present embodiment. It is noted that, in FIG. 14, with respect to parts in common with those in the aforementioned FIGS. 8A and 8B, the description will be omitted.

FIG. 14A is a schematic diagram of overall configuration showing one example of an allocation control of radio resources (frequencies and time slots) in two common areas adjacent to each other in the mobile communication system according to the present embodiment. FIG. 14B is an explanatory illustration of allocation control of radio resources (frequencies and time slots) in a first common area overlapped between the terrestrial station area 200A in a normal condition and the first satellite station area 400A. FIG. 14C is an explanatory illustration of allocation control of radio resources (frequencies and time slots) in a second common area overlapped between the terrestrial station area 200B in an emergent condition and the second satellite station area 400B.

The first common area in the normal condition in FIG. 14A is, for example, a non-disaster generating area, in which the rate of communication traffic of the terrestrial cellular mobile communication system by the terrestrial cellular base stations 20A and the rate communication traffic of the satellite mobile communication system by the satellite base station 30 is equal or almost equal to each other. Accordingly, as shown in FIG. 14B, six radio resources (time slots T0 to T3 at frequency f0 and time slots T0 and T1 at frequency f1) are allocated to the radio resources of the terrestrial cellular mobile communication system. Also, six radio resources (time slots T2 and T3 at frequency f1 and time slots T0 to T3 at frequency f2) are allocated to the radio resources of the satellite mobile communication system by the satellite base station 30.

On the other hands, the second common area in the emergent condition in FIG. 14A is, for example, a disaster generating area (disaster afflicted area) where a disaster such as an earthquake occurs, in which a failure occurs in one of the terrestrial cellular base stations 20B and the communication by the mobile station apparatus 10 in the failure generating area is covered with the satellite mobile communication system. Accordingly, as shown in FIG. 14C, two radio resources (time slots T0 and T1 at frequency f0) are allocated to the radio resources of the terrestrial cellular mobile communication system and ten radio resources (time slots T2 and T3 at frequency f0 and time slots T0 to T3 at frequencies f1 and f2) are allocated to the radio resources of the satellite mobile communication system. By this way, in the second common area in the emergent condition where a failure occurs in the terrestrial cellular mobile communication system, while maintaining the spectral efficiency used for mobile communications, mobile communication services with the mobile station apparatus 10 can be surely used in the common area.

It is noted that, in each of the foregoing embodiments, although it is described the cases in which a same radio transmission system is used for radio communications between the mobile station apparatus 10 and each of the terrestrial base station 20 and the communication relay apparatus 41 of the artificial satellite 40, radio transmission systems different from each other may be used for radio communications between the mobile station apparatus 10 and each of the terrestrial base station 20 and the communication relay apparatus 41 of the artificial satellite 40.

Figure 15:
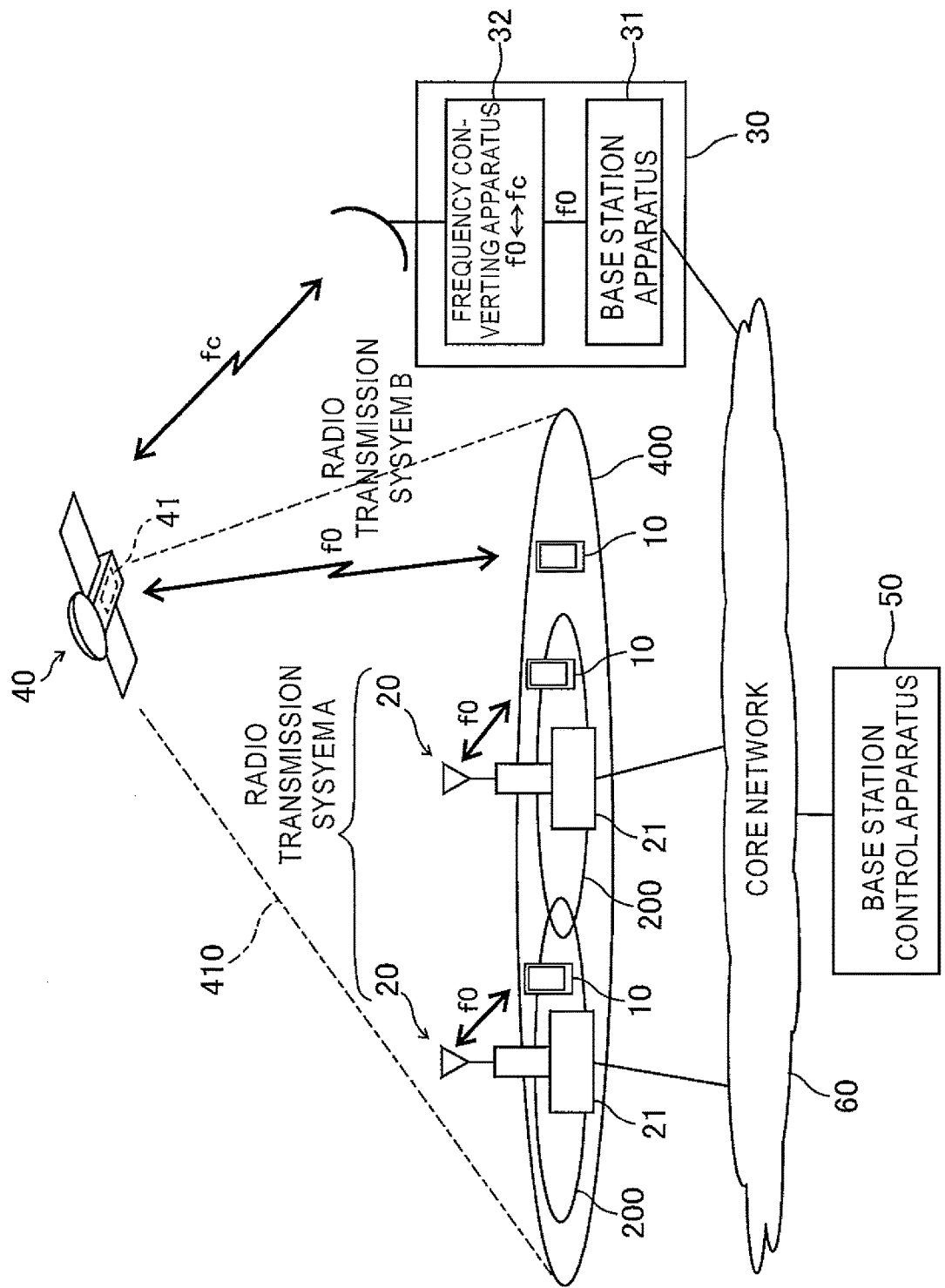
FIG. 15 is an explanatory illustration showing yet another example of an overall configuration of a mobile communication system according to an embodiment of the present invention.

FIG. 15 is an explanatory illustration showing yet another example of an overall configuration of a mobile communication system according to an embodiment of the present invention. In the present embodiment, a radio transmission system A corresponding to terrestrial cellular base stations is used for radio communications between the terrestrial cellular base stations 20 and the mobile station apparatus 10, and a radio transmission system B corresponding to satellite base stations, which is different from the foregoing radio transmission system A, is used for radio communications between the satellite base station 30 and the mobile station apparatus 10 via the communication relay apparatus 41 of the artificial satellite 40. It is noted, in FIG. 15, with respect to parts in common with those in the aforementioned FIG. 1, etc., the description will be omitted.

Figure 16A:
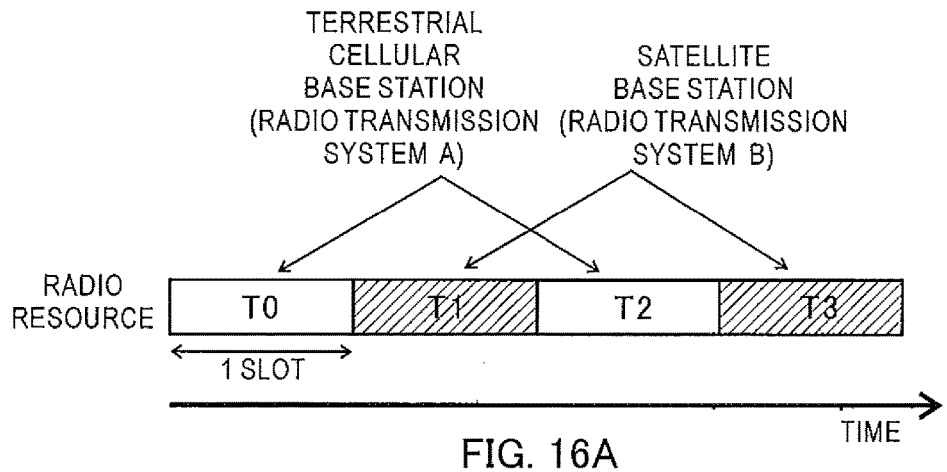
FIG. 16A to FIG. 16C are respectively explanatory illustrations showing allocation of radio resources in the mobile communication system according to the embodiment in FIG. 15.

In FIG. 15, the terrestrial cellular base station 20 communicates with the mobile station apparatus 10 at the frequency f0 by using the predetermined radio transmission system A corresponding to terrestrial cellular base stations. The satellite base station 30 converts the frequency f0 to the frequency fc for satellite communications and communicates with the communication relay apparatus 41 of the artificial satellite 40 by using the radio transmission system B corresponding to satellite base stations, which is different from the foregoing radio transmission system A. For example, in the case that an allocation control is performed so that the time slots used in the terrestrial cellular base stations 20 and the time slots used in the satellite base station 30 do not overlapped with each other as shown in aforementioned FIG. 4, as shown in FIG. 16A, the radio transmission system A corresponding to terrestrial cellular base stations is used for communications between the terrestrial cellular base stations 20 and the mobile station apparatus 10 via the radio resources of time slots T0 and T2. On the other hand, the radio transmission system B corresponding to satellite base stations is used for communications between the satellite base station 30 and the mobile station apparatus 10 via the radio resources of time slots T1 and T3.

Figure 16B:
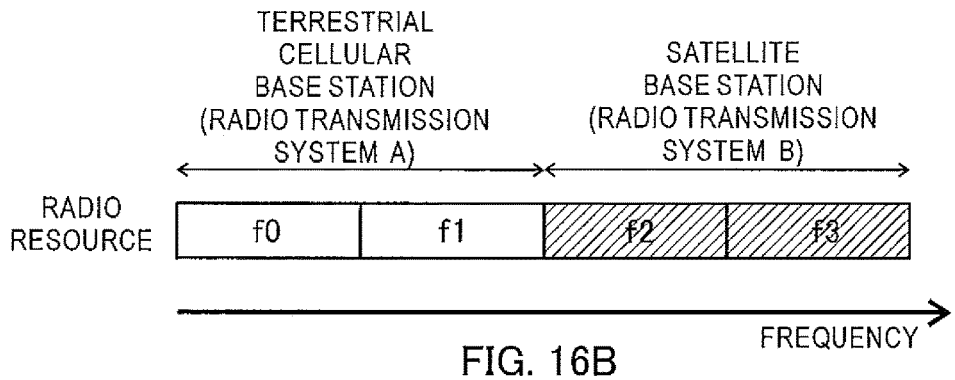

Furtheremore, in the case that an allocation control is performed so that the frequencies used in the terrestrial cellular base stations 20 and the frequencies used in the satellite base station 30 do not overlapped with each other as shown in aforementioned FIG. 3, as shown in FIG. 16B, the radio transmission system A corresponding to terrestrial cellular base stations is used for communications between the terrestrial cellular base stations 20 and the mobile station apparatus 10 via the radio resources of frequencies f0 and f1. On the other hand, the radio transmission system B corresponding to satellite base stations is used for communications between the satellite base station 30 and the mobile station apparatus 10 via the radio resources of frequencies f2 and f3.

Figure 16C:
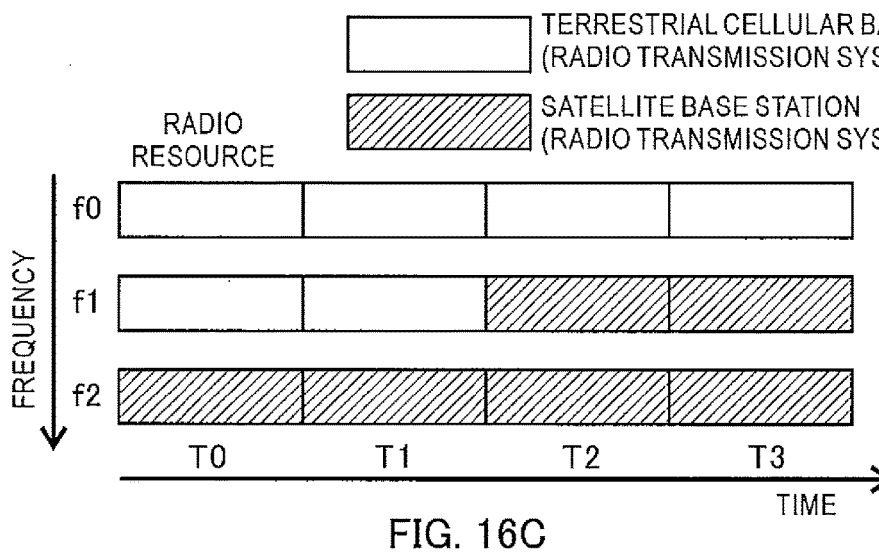

Moreover, in the case that an allocation control is performed so that the radio resources (frequencies and time slots) used in the terrestrial cellular base stations 20 and the radio resources (frequencies and time slots) used in the satellite base station 30 do not overlapped with each other as shown in aforementioned FIG. 5, as shown in FIG. 16C, the radio transmission system A corresponding to terrestrial cellular base stations is used for communications between the terrestrial cellular base stations 20 and the mobile station apparatus 10 via the radio resources for terrestrial cellular base stations (time slots T0 to T3 at frequency f0 and time slots T0 and T1 at frequency f1). On the other hand, the radio transmission system B corresponding to satellite base stations is used for communications between the satellite base station 30 and the mobile station apparatus 10 via the radio resources for satellite base stations (time slots T2 and T3 at frequency f1 and time slots T0 to T3 at frequency f2).

In the embodiment in FIGS. 15 and 16, the mobile station apparatus 10 is provided with a radio apparatus corresponding to both of the radio transmission system A corresponding to terrestrial cellular base stations and the radio transmission system B corresponding to satellite base stations. The radio transmission system A corresponding to terrestrial cellular base stations includes, for example, a wide-band transmission system using an adaptive modulation system (Adaptive Modulation and Coding: AMC) such as a communication system of the third generation mobile communication system (3G) such as the WCDMA (registered trademark), a communication system of the fourth mobile phone of the LTE or LTE-Advanced. The radio transmission system B corresponding to satellite base stations includes, for example, a narrow-band SCPC (Single Channel Per Carrier) or the like using a modulation system such as the BPSK (Binary Phase Shift Keying), QPSK (Quadrature Phase Shift Keying), etc. In this way, since the radio transmission system suitable for communications with the communication relay apparatus of artificial satellite can be used as a radio transmission system of the satellite mobile communication system in the satellite base station 30, it is capable of improving communication quality of the satellite mobile communication system.

It is noted that, in FIGS. 15 and 16, although it is shown the case in which the artificial satellite 40 has a single-beam configuration, even in the case in which the artificial satellite 40 has a multi-beam configuration, the radio transmission system A corresponding to terrestrial cellular base stations may be used for communications between the terrestrial cellular base stations 20 and the mobile station apparatus 10 and the radio transmission system B corresponding to satellite base stations may be used for communications between the satellite base station 30 and the mobile station apparatus 10. Also, even in the case in which the radio transmission system A is used for the terrestrial cellular base stations 20 and the radio transmission system B is used for the satellite base station 30, the above-described allocation controls of radio resources as shown in FIGS. 3 to 8 and the above-described exchange controls of radio resource allocation in the emergent condition as shown in FIGS. 9 to 14 may be performed.

Furthermore, in each of the foregoing embodiments, although the examples in which the base station control apparatus 50 is connected to the core network 60 as an apparatus separated from the respective base stations 20 and 30, the base station control apparatus 50 may be configured so as to be incorporated in the terrestrial cellular base stations 20 or the satellite base station 30. The terrestrial cellular base station 20 or the satellite base station 30 may be configured so as to have a function of the base station control apparatus 50.

Moreover, in each of the foregoing embodiments, although the mobile station apparatus 10 locating in the foregoing common area is capable of communicating by using both of the terrestrial cellular mobile communication system and the satellite mobile communication system, the mobile station apparatus 10 may be controlled so as to communicate by using the terrestrial cellular mobile communication system preferentially in the normal condition. For example, a threshold corresponding to a receiving power capable of communicating may be preset, and the mobile station apparatus 10 may be controlled so as to communicate by using the terrestrial cellular mobile communication system when a receiving power in the terrestrial cellular mobile communication system is equal to or more than the threshold. Also, with respect to which of the communication systems is preferentially selected by the mobile station apparatus 10, it may be controlled by means of changing the threshold value with the base station control apparatus 50.

It is noted that process steps and configuration elements in the base station control apparatus 50, the terrestrial cellular base stations 20, the satellite base station 30, the communication relay apparatus 41, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 mobile station apparatus
20 terrestrial cellular base station
30 satellite base station
40 artificial satellite
41 communication relay apparatus
50 base station control apparatus
60 core network
200 terrestrial station area
400 satellite station area 410 beam

The invention claimed is:

1. A mobile communication system that uses a terrestrial cellular mobile communication system and a satellite mobile communication system, the mobile communication system comprising:
   terrestrial cellular base stations that perform a radio communication with a mobile station apparatus;
   a satellite base station that performs a radio communication with a mobile station apparatus via a communication relay apparatus of an artificial satellite; and
   a base station control apparatus of controlling the terrestrial cellular base stations and the satellite base station,
   wherein a same frequency band is used for radio communications between the mobile station apparatus and each of the terrestrial cellular base stations and the communication relay apparatus of the artificial satellite in a common area where the terrestrial cellular mobile communication system and the satellite mobile communication system are available, and
   wherein the base station control apparatus controls to allocate a first set of time slots used in the terrestrial cellular base stations and a second set of time slots used in the satellite base station in the common area so that none of the first set of time slots overlap with any of the second set of time slots and to increase an allocation rate of the second set of time slots allocated for the satellite base station in a predetermined radio communication frame of the same frequency band in an emergent condition in which a failure occurs in a part of the terrestrial cellular base stations so as to be more than that in a normal condition, in a state that the terrestrial cellular base stations and the satellite base station in the common area are synchronized in time with each other.

2. The mobile communication system according to claim 1, wherein the base station control apparatus controls to divide in time each of two or more divided frequency bands into which the same frequency band is divided, to allocate the first set of time slots in the divided frequency band used in the terrestrial cellular base stations and the second set of time slots in the divided frequency band used in the satellite base station in the common area so as not to overlap with each other, and to increase an allocation rate of the second set of time slots in the divided frequency band allocated for the satellite base station in the emergent condition so as to be more than that in the normal condition, in a state that the terrestrial cellular base stations and the satellite base station are in the common area synchronized in time and in frequency with each other.

3. The mobile communication system according to claim 1, wherein the base station control apparatus controls the allocation rate of the second set of time slots for the satellite base station and an allocation rate of the first set of time slots allocated for the terrestrial cellular base stations according to a ratio between a communication traffic in the terrestrial cellular base stations and a communication traffic in the satellite base station, in the emergent condition or in the normal condition.

4. The mobile communication system according to claim 1,
   wherein an area in which the communication relay apparatus and the mobile station apparatus communicate with each other is a single beam area corresponding to a beam directing along orientation of an antenna of the communication relay apparatus, and
   wherein the single beam area includes two or more areas of the terrestrial cellular base stations.

5. The mobile communication system according to claim 1,
   wherein areas in which the communication relay apparatus and the mobile station apparatus communicate with each other are two or more beam areas corresponding to two or more beams directing along different orientations of antennas of the communication relay apparatus, the two or more beams being spatially shifted,
   wherein each of the two or more beam areas includes two or more areas of the terrestrial cellular base stations, and
   wherein the base station control apparatus performs the control of the allocation rate of the second set of time slots independently in each of the two or more beam areas in the emergent condition or in the normal condition.

6. The mobile communication system according to claim 1, further comprising the communication relay apparatus of the artificial satellite,
   wherein the satellite base station comprises a base station apparatus connected with a core network, and frequency converting means of performing a conversion between a frequency used in the base station apparatus and a frequency for satellite communications used in a communication with the communication relay apparatus of artificial satellite when relaying a communication between the base station apparatus and the communication relay apparatus of the artificial satellite, and
   wherein the communication relay apparatus of the artificial satellite comprises frequency converting means of performing a conversion between a frequency used in a communication with the mobile station apparatus and a frequency for satellite communications used in a communication with the satellite base station when relaying a communication between the mobile station apparatus and the satellite base station.

7. The mobile communication system according to claim 1, wherein a radio transmission system used for radio communications between the mobile station apparatus and each of the terrestrial cellular base stations is the same as a radio transmission system used for radio communications between the mobile station apparatus and the communication relay apparatus of the artificial satellite.

8. The mobile communication system according to claim 1, wherein a radio transmission system used for radio communications between the mobile station apparatus and each of the terrestrial cellular base stations is different than a radio transmission system used for radio communications between the mobile station apparatus and the communication relay apparatus of the artificial satellite.

9. A base station control apparatus that controls terrestrial cellular base stations that perform a radio communication with a mobile station apparatus and a satellite base station that performs a radio communication with a mobile station apparatus via a communication relay apparatus of an artificial satellite in a mobile communication system that uses a terrestrial cellular mobile communication system and a satellite mobile communication system,
wherein a same frequency band is used for radio communications between the mobile station apparatus and each of the terrestrial cellular base stations and the communication relay apparatus of the artificial satellite in a common area where the terrestrial cellular mobile communication system and the satellite mobile communication system are available, and
wherein the base station control apparatus controls to allocate a first set of time slots used in the terrestrial cellular base stations and a second set of time slots used in the satellite base station in the common area so that none of the first set of time slots overlap with any of the second set of time slots and to increase an allocation rate of the second set of time slots allocated for the satellite base station in a predetermined radio communication frame of the same frequency band in an emergent condition in which a failure occurs in a part of the terrestrial cellular base stations so as to be more than that in a normal condition, in a state that the terrestrial cellular base stations and the satellite base station in the common area are synchronized in time with each other.

10. The base station control apparatus according to claim 9, wherein the base station control apparatus controls to divide in time each of two or more divided frequency bands into which the same frequency band is divided, to allocate the first set of time slots in the divided frequency band used in the terrestrial cellular base stations and the second set of time slots in the divided frequency band used in the satellite base station in the common area so as not to overlap with each other, and to increase an allocation rate of the second set of time slots in the divided frequency band allocated for the satellite base station in the emergent condition so as to be more than that in the normal condition, in state that the terrestrial cellular base stations and the satellite base station are in the common area synchronized in time and in frequency with each other.

11. The base station control apparatus according to claim 9, wherein the base station control apparatus controls the allocation rate of the second set of time slots for the satellite base station and an allocation rate of the first set of time slots allocated for the terrestrial cellular base stations according to a ratio between a communication traffic in the terrestrial cellular base stations and a communication traffic in the satellite base station, in the emergent condition or in the normal condition.

12. The base station control apparatus according to claim 9,
wherein the area in which the communication relay apparatus and the mobile station apparatus communicate with each other is a single beam area corresponding to a beam directing along orientation of an antenna of the communication relay apparatus, and
wherein the single beam area includes two or more areas of the terrestrial cellular base stations.

13. The base station control apparatus according to claim 9,
wherein the areas in which the communication relay apparatus and the mobile station apparatus communicate with each other are two or more beam areas corresponding to two or more beams directing along different orientations of antennas of the communication relay apparatus, the two or more beams being spatially shifted,
wherein each of the two or more beam areas includes two or more areas of the terrestrial cellular base stations, and
wherein the base station control apparatus performs the control of the allocation rate of the second set of time slots independently in each of the two or more beam areas in the emergent condition or in the normal condition.

14. For a mobile communication system including a mobile base station apparatus, terrestrial cellular base stations that perform a radio communication with the mobile station apparatus, and a satellite base station that performs a radio communication with the mobile base station apparatus via a communication relay apparatus of an artificial satellite, a method comprising:
communicating between the mobile station apparatus and each of the terrestrial cellular base stations using a first frequency band;
communicating between the mobile station apparatus and the communication relay apparatus of the artificial satellite using the first frequency band;
for a common area where the terrestrial cellular mobile communication system and the satellite mobile communication system are available, allocating a first set of time slots used in the terrestrial cellular base stations and a second set of time slots used in the satellite base station so that none of the first set of time slots overlap with the second set of time slots; and
in a state that the terrestrial cellular base stations and the satellite base station in the common area are synchronized in time with each other, increasing an allocation rate of the second set of time slots in a predetermined radio communication frame of the same frequency band in an emergent condition in which a failure occurs in a part of the terrestrial cellular base stations so as to be more than that in a normal condition.

15. The method according to claim 14, further comprising:
controlling an allocation rate of the first set of time slots and the allocation rate of the second set of time slots according to a ratio between a communication traffic in the terrestrial cellular base stations and a communication traffic in the satellite base station, in the emergent condition or in the normal condition.

16. The method according to claim 14,
wherein an area in which the communication relay apparatus and the mobile station apparatus communicate with each other is a single beam area corresponding to a beam directing along orientation of an antenna of the communication relay apparatus, and wherein the single beam area includes two or more areas of the terrestrial cellular base stations.

17. The method according to claim 14, wherein areas in which the communication relay apparatus and the mobile station apparatus communicate with each other are two or more beam areas corresponding to two or more beams directing along different orientations of antennas of the communication relay apparatus, the two or more beams being spatially shifted, and each of the two or more beam areas includes two or more areas of the terrestrial cellular base stations, and wherein the method further comprises:
controlling the allocation rate of the second set of time slots independently in each of the two or more beam areas in the emergent condition or in the normal condition.

18. The method according to claim 14, wherein the satellite base station comprises a base station apparatus connected with a core network, and the method further comprises:
converting between a frequency used in the base station apparatus and a frequency for satellite communications used in a communication with the communication relay apparatus of the artificial satellite when relaying a communication between the base station apparatus and the communication relay apparatus of the artificial satellite, and
converting between a frequency used in a communication with the mobile station apparatus and a frequency for satellite communications used in a communication with the satellite base station when relaying a communication between the mobile station apparatus and the satellite base station.

19. The method of claim 14, further comprising:
using a same radio transmission system for: radio communications between the mobile station apparatus and each of the terrestrial cellular base stations, and for radio communications between the mobile station apparatus and the communication relay apparatus of the artificial satellite.

20. The method of claim 14, further comprising:
using different radio transmission systems for: radio communications between the mobile station apparatus and each of the terrestrial cellular base stations, and for radio communications between the mobile station apparatus and the communication relay apparatus of the artificial satellite.

* * * * *

UNITED STATES PATENT AND TRADEMARK OFFICE
CERTIFICATE OF CORRECTION

PATENT NO.       : 10,149,176 B2
APPLICATION NO.  : 15/114470
DATED            : December 4, 2018
INVENTOR(S)      : Junichi Miyakawa Page 1 of 1

It is certified that error appears in the above-identified patent and that said Letters Patent is hereby corrected as shown below:

On the Title Page

(71) Applicant should read: SoftBank Corp., Tokyo (JP)

(22) PCT Filed should read: Jan. 28, 2014

Signed and Sealed this
Fifth Day of February, 2019

Andrei Iancu
*Director of the United States Patent and Trademark Office*